United States Patent
Kim et al.

(10) Patent No.: US 12,447,828 B2
(45) Date of Patent: *Oct. 21, 2025

(54) POWER SUPPLY SYSTEM OF AIRCRAFT AND CONTROL METHOD THEREOF

(71) Applicants: Hyundai Motor Company, Seoul (KR); Kia Corporation, Seoul (KR)

(72) Inventors: Jong Pil Kim, Suwon-Si (KR); Woo Young Lee, Yongin-Si (KR); Hee Kwang Lee, Seoul (KR); Jung Hyun Lee, Gunpo-Si (KR); Sae Kwon Chang, Yongin-Si (KR); Mi Jin Kim, Gwacheon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 62 days.

This patent is subject to a terminal disclaimer.

(21) Appl. No.: 18/385,549

(22) Filed: Oct. 31, 2023

(65) Prior Publication Data

US 2024/0157808 A1    May 16, 2024

(30) Foreign Application Priority Data

Nov. 14, 2022  (KR) .......................... 10-2022-0151661

(51) Int. Cl.
*B60L 15/00* (2006.01)
*B60L 3/12* (2006.01)
(Continued)

(52) U.S. Cl.
CPC .............. *B60L 15/007* (2013.01); *B60L 3/12* (2013.01); *B60L 50/75* (2019.02); *B60L 58/40* (2019.02);
(Continued)

(58) Field of Classification Search
CPC .......... B60L 15/007; B60L 3/12; B60L 50/75; B60L 58/40; B60L 2200/10;
(Continued)

(56) References Cited

U.S. PATENT DOCUMENTS

| | | |
|---|---|---|
| 8,344,544 B2 | 1/2013 | Rozman et al. |
| 10,727,554 B2 | 7/2020 | Oya |

(Continued)

FOREIGN PATENT DOCUMENTS

| | | | |
|---|---|---|---|
| AU | 2019279949 A1 | 9/2020 | |
| FR | 3065840 A1 | 11/2018 | |

(Continued)

OTHER PUBLICATIONS

May 10, 2024—(EP) European Search Report—App 23209417.7.
Jul. 4, 2024—(EP) European Search Report—App. 23213194.6.

*Primary Examiner* — Elim Ortiz
(74) *Attorney, Agent, or Firm* — Banner & Witcoff, Ltd.

(57) ABSTRACT

A power supply system for an aircraft and a control method thereof are provided. The power supply system of the aircraft includes a fuel cell configured to generate electrical energy, a converter device configured to supply a voltage generated by the fuel cell to a first motor device for driving the aircraft through a first output terminal and switch a connection with the fuel cell depending on a predetermined driving mode, a battery configured to supply the voltage to a second motor device for driving the aircraft through a second output terminal, the second output terminal being connected with an output node of the fuel cell, and a processor configure to control a connection between the fuel cell and the converter device depending on the driving mode.

19 Claims, 16 Drawing Sheets

(51) Int. Cl.
    *B60L 50/75*       (2019.01)
    *B60L 58/40*       (2019.01)

(52) U.S. Cl.
    CPC ....... *B60L 2200/10* (2013.01); *B60L 2220/42* (2013.01)

(58) Field of Classification Search
    CPC ...... B60L 2220/42; B60L 50/50; B60L 53/00; Y02T 90/40; Y02T 50/50; Y02T 50/06; H02J 2310/44; H02J 1/10; H02J 7/34; H02J 2300/30; H02J 1/106; H02J 1/12; H02J 7/342; B64D 27/24; B64D 41/00; B64D 2041/005; B64D 31/06; B64D 2221/00; H01M 8/0494; H01M 8/04947; H01M 2250/20; H01M 16/006; Y02E 60/50; Y02E 60/10
    USPC ....... 244/58, 53 R, 60; 307/45; 363/71, 142, 363/43, 98
    See application file for complete search history.

(56) References Cited

U.S. PATENT DOCUMENTS

| | | |
|---|---|---|
| 11,121,565 B2 | 9/2021 | Dunn et al. |
| 11,462,918 B2 | 10/2022 | Crouse, Jr. |
| 2003/0230671 A1 | 12/2003 | Dunn |
| 2008/0144342 A1 | 6/2008 | Du et al. |
| 2012/0318914 A1 | 12/2012 | Rajashekara et al. |
| 2013/0270912 A1 | 10/2013 | Krenz |
| 2016/0264006 A1 | 9/2016 | Chou et al. |
| 2016/0297544 A1 | 10/2016 | Kim et al. |
| 2017/0207634 A1 | 7/2017 | Katano et al. |
| 2018/0141674 A1 | 5/2018 | Bailey et al. |
| 2018/0233793 A1 | 8/2018 | Oya |
| 2019/0229542 A1 | 7/2019 | Dunn et al. |
| 2019/0291599 A1 | 9/2019 | Andou et al. |
| 2019/0322376 A1* | 10/2019 | Pan ......................... H02S 10/40 |
| 2020/0180774 A1* | 6/2020 | Rainville ............... B64U 50/32 |
| 2020/0274368 A1* | 8/2020 | Crouse, Jr. ............ B64U 50/19 |
| 2021/0229822 A1 | 7/2021 | Morrison |
| 2022/0021313 A1 | 1/2022 | Kitamoto |
| 2022/0388628 A1* | 12/2022 | Regnier .................... B64C 3/34 |
| 2022/0402621 A1* | 12/2022 | McLean ................ B64D 31/18 |

FOREIGN PATENT DOCUMENTS

| | | | |
|---|---|---|---|
| JP | 2018-133247 | A | 8/2018 |
| JP | 2019-110654 | A | 7/2019 |
| KR | 10-2018-0000639 | A | 1/2018 |
| KR | 102161980 | B1 | 10/2020 |
| KR | 10-2021-0062113 | A | 5/2021 |

* cited by examiner

POWER SUPPLY SYSTEM OF AIRCRAFT AND CONTROL METHOD THEREOF

CROSS-REFERENCE TO RELATED APPLICATION

This application claims the benefit of priority to Korean Patent Application No. 10-2022-0151661, filed in the Korean Intellectual Property Office on Nov. 14, 2022, the entire contents of which are incorporated herein by reference.

TECHNICAL FIELD

The present disclosure relates to a power supply system for an aircraft and a control method thereof, and more particularly, relates to technologies using eco-friendly energy.

BACKGROUND

Research has been actively conducted on aircraft for future traffic and transportation systems. An aircraft uses its motor to drive its propeller. In this case, there is a need for a power supply system called a powertrain for supplying power to the motor.

The power supply system may use a fuel cell or a battery. The fuel cell is advantageous for increasing a cruising distance, but is heavy. The battery has high power compared to its weight, but has a limitation to increase a cruising distance due to discharging.

Thus, there is a need to develop a power supply system capable of increasing efficiency.

SUMMARY

The present disclosure has been made to solve the above-mentioned problems occurring in the prior art.

Systems, apparatuses, methods are described for a power supply system of an aircraft. The power supply system may comprise a fuel cell configured to generate a voltage; a converter device configured to: supply, through a first output terminal of the power supply system, the voltage generated by the fuel cell to a first motor device for driving the aircraft; and switch a connection with the fuel cell depending on a predetermined driving mode; a battery configured to supply, through a second output terminal of the power supply system, the voltage to a second motor device for driving the aircraft, the second output terminal being connected with an output node of the fuel cell; and a processor configured to control a connection between the fuel cell and the converter device depending on the predetermined driving mode.

A control method of power supply system for an aircraft may comprise supplying, by a converter device of the power supply system, a voltage of a fuel cell to a first motor device through a first output terminal of the power supply system in a first mode of the power supply system; supplying, by a battery device of the power supply system, the voltage to a second motor device through a second output terminal of the power supply system; and connecting, by the converter device, the first output terminal with the second output terminal to charge the battery device using the voltage output by the fuel cell, such that the power supply system operates in a second mode, if the aircraft ascends above a predetermined first threshold altitude.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
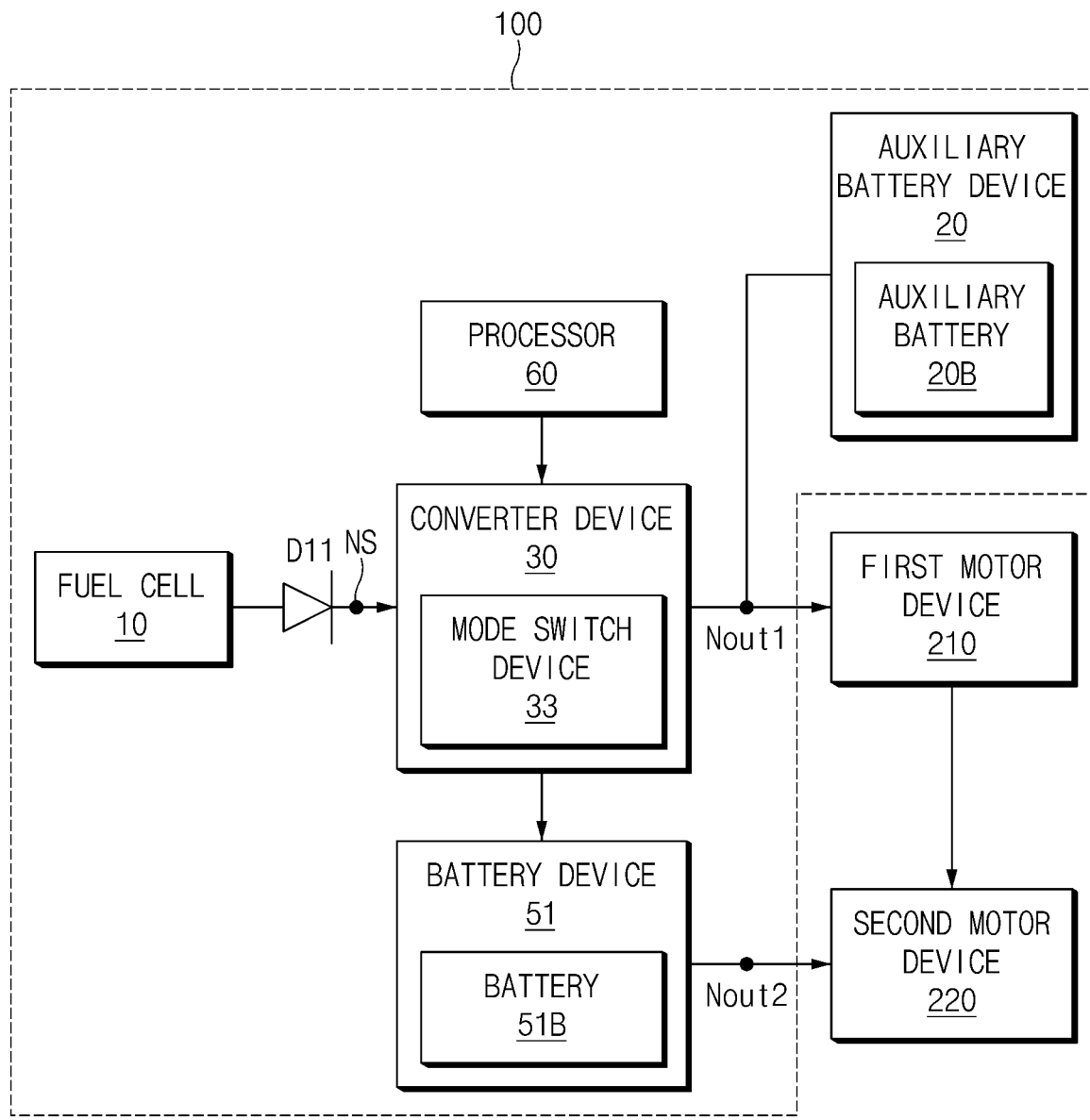
FIG. 1 shows an example configuration of a power supply system for an aircraft.

Hereinafter, some examples of the present disclosure will be described in detail with reference to the accompanying drawings. In adding the reference numerals to the components of each drawing, it should be noted that the identical component is designated by the identical numerals even if they are displayed on other drawings. Further, in describing examples of the present disclosure, a detailed description of some features or functions will be skipped to focus on the gist of the present disclosure.

In describing examples according to the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the related field of art, and are not to be interpreted as having ideal or excessively formal meanings unless clearly defined as having such in the present application.

Hereinafter, examples of the present disclosure will be described in detail with reference to FIGS. 1 to 16.

FIG. 1 shows an example of a configuration of a power supply system for an aircraft. Hereinafter, the aircraft to which an example of the present disclosure is applicable may refer to a mobility vehicle capable of flying over the sky. In other words, other than referring to the means of flight, such as a helicopter, a drone, and an airplane, the aircraft may include a vehicle capable of flying with its wheels off the ground while moving on the ground using the wheels or the like. The aircraft may include an unmanned aircraft and a manned aircraft. Furthermore, the manned aircraft may include an airframe capable of controlled by autonomous flight, other than an airframe controlled by a pilot.

Referring to FIG. 1, a power supply system 100 for an aircraft may supply power to a first motor device 210 and a second motor device 220. Each of the first motor device 210 and the second motor device 220 may drive a propeller for the flight of the aircraft, which may include one or more motors.

The power supply system 100 of the aircraft may include a fuel cell 10, an auxiliary battery device 20, a converter device 30, a first battery device 51, and a processor 60.

The fuel cell 10 may electrochemically react fuel gas and oxygen to convert chemical energy into electrical energy. The fuel cell 10 may include one or more cells. Each cell may receive hydrogen gas included in fuel gas and air and may induce oxidation and reduction reactions to generate electrical energy. The cell may be protected from the outside (e.g., external factors) by an endplate, and may include at least one separator for supplying fuel gas and air to the membrane-electrode assembly (MEA) which oxidizes/reduces the hydrogen gas and air.

The power supply system 100 may further include a balance of plant (BOP) for driving the fuel cell 10. The BOP may include a fuel supply device, an air supply device, a humidity and water adjustment device, a heat treatment device, and the like.

The auxiliary battery device 20 may include an auxiliary battery 20B and a circuit device. The auxiliary battery 20B may make up for low responsiveness where the fuel cell 10 outputs a voltage. The auxiliary battery 20B may be one battery or may be formed of two or more batteries that are connected in parallel with each other. The circuit device may control a timing if the auxiliary battery 20B supplies a voltage to a first output terminal Nout1, under control of the processor 60.

The converter device 30 may boost a voltage output by the fuel cell 10 and may supply the boosted voltage to the first motor device 210 through the first output terminal Nout1. Furthermore, the converter device 30 may distribute power generated by the fuel cell 10 to charge a first battery 51B, under control of the processor 60.

To this end, the converter device 30 may include a mode switch device 33 and a half-bridge converter.

The half-bridge converter may include a pair of converter switches and an inductor.

The mode switch device 33 may be selectively connected with an output node Ns of the fuel cell 10. In other words, the mode switch device 33 may switch a connection between the output node Ns of the fuel cell 10 and the half-bridge converter, under control of the processor 60. Furthermore, the mode switch device 33 may switch a connection between the first output terminal Nout1 of the converter device 30 and a second output terminal Nout2 of the first battery device 51, under control of the processor 60.

The first battery device 51 may include the first battery 51B and a circuit device. The battery 51B may supply a voltage to the second motor device 220 through the second output terminal Nout2. The first battery 51B may be one battery or may be formed of two or more batteries that are connected in parallel with each other. The circuit device may control a timing if the first battery 51B supplies a voltage to the second output terminal Nout2, under control of the processor 60.

The processor 60 may set a driving mode for adjusting a path where the converter device 30 outputs a voltage depending on the altitude of the aircraft.

The processor 60 may set the driving mode to a first mode in a take-off duration. The take-off duration may be a duration if the altitude of the aircraft is less than a predetermined first threshold altitude, after the aircraft is turned on.

In the first mode, the processor 60 may control the mode switch device 33 to connect the half-bridge converter of the converter device 30 with the output node Ns of the fuel cell 10. Furthermore, in the first mode, the processor 60 may control the mode switch device 33 to disconnect the connection between the half-bridge converter of the converter device 30 and the second output terminal Nout2 of the first battery device 51.

As a result, in the first mode, the voltage output by the fuel cell 10 may be supplied to the first motor device 210 through the first output terminal Nout1, and the voltage output by the first battery 51B may be supplied to the second motor device 220 through the second output terminal Nout2. In other words, in the take-off duration, based on that the required power of the aircraft is high, the power supply system 100 may drive the first motor device 210 and the second motor device 220 using substantial amount (e.g., all) of output voltages of the fuel cell 10 and the first battery 51B.

The processor 60 may set the driving mode to a second mode in a cruising duration. The cruising duration may be a duration where the aircraft ascends above a first threshold altitude and maintains a predetermined second threshold altitude or more. The second threshold altitude may be an altitude which is the same as or different from the first threshold altitude.

In the second mode, the processor 60 may control the mode switch device 33 to disconnect the half-bridge converter of the converter device 30 from the output node Ns of the fuel cell 10. Furthermore, in the second mode, the processor 60 may control the mode switch device 33 to connect the half-bridge converter of the converter device 30 with the second output terminal Nout2 of the first battery device 51. In the cruising duration, the power supply system 100 may charge the first battery 51B using power of the fuel cell 10.

In the cruising duration, the aircraft may generate thrust for a flight at a very low level of power in preparation for takeoff or landing under the influence of lift. Thus, the fuel cell 10 may charge the first battery 51B using a portion of power capable of being generated.

Because the first battery 51B may be charged using the power from the fuel cell 10 in the cruising duration dug, although the capacity of the first battery 51B may be reduced compared to before, the first battery 51B may satisfy power consumed by the second motor device 220. Thus, the capacity of the first battery 51B may be reduced. Thus, the manufacturing cost of the power supply system 100 may be reduced. Furthermore, because the capacity of the first battery 51B is reduced, the weight of the aircraft may be decreased and a flight distance may be increased.

Figure 2:
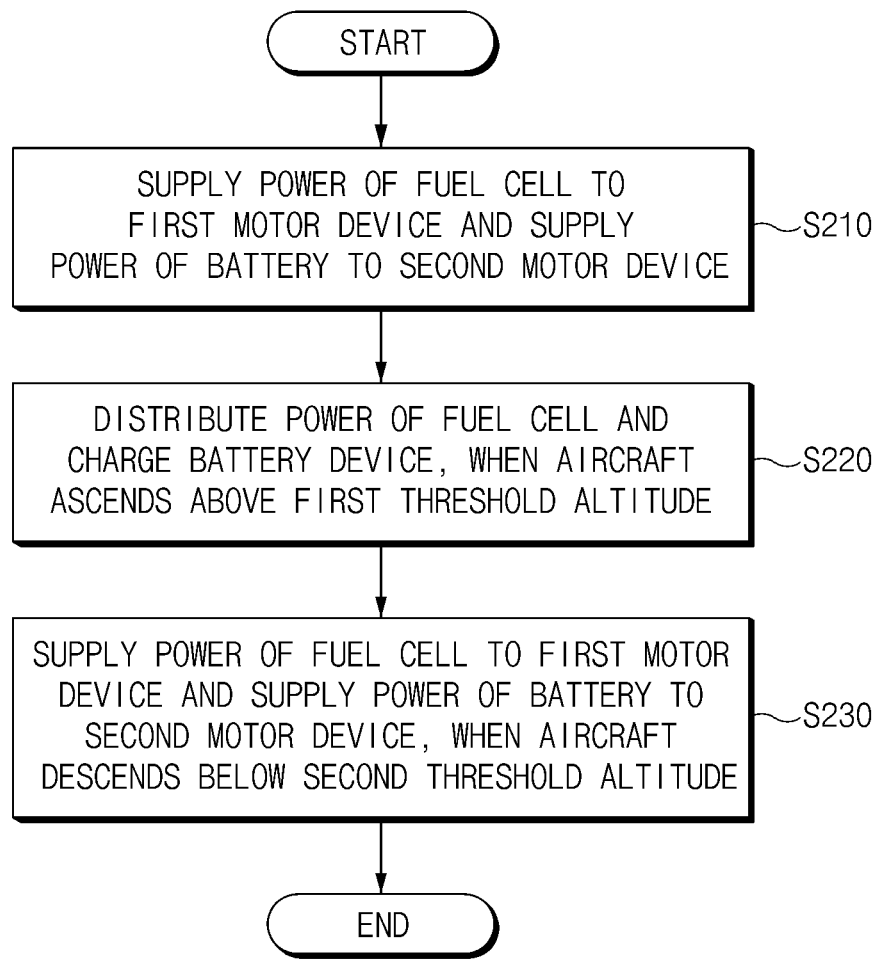
FIG. 2 shows an example of a flowchart showing steps of a control method of a power supply system for an aircraft.

FIG. 2 shows an example of a flowchart showing steps of a control method of a power supply system for an aircraft.

A description will be given of the control method of the power supply system of the aircraft with reference to FIGS. 1 and 2.

In S210, a processor 60 may control a power supply system 100 based on a first mode. In other words, a converter device 30 may supply a voltage generated by a fuel cell 10 to a first motor device 210 through a first output terminal Nout1. Furthermore, a battery device 51 may supply the voltage to a second motor device 220 through a second output terminal Nout2.

In S220, if the aircraft ascends above a first threshold altitude, the processor 60 may control the power supply system 100 based on a second mode. In other words, the processor 60 may control a mode switch device 33 to charge a first battery 51B using the voltage of the first output terminal Nout1 of the converter device 30.

In S230, if the aircraft descends below a second threshold altitude, the processor 60 may control the power supply system 100 based on the first mode. The operation of the power supply system 100 in the first mode may be the same as the procedure in S210.

Figure 3:
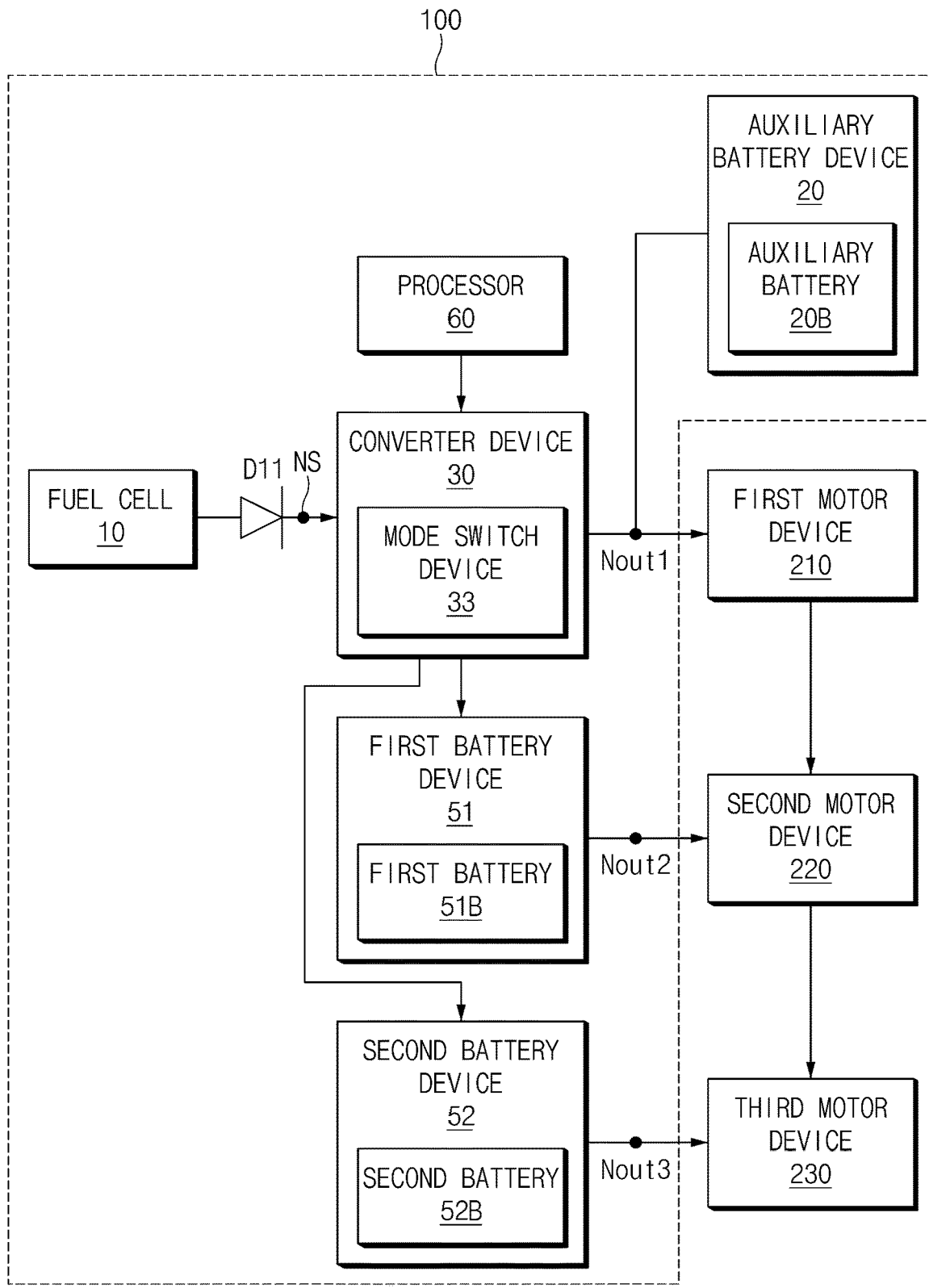
FIG. 3 shows another example of a configuration of a power supply system for an aircraft.

FIG. 3 shows another example of a configuration of a power supply system for an aircraft. A detailed description of substantially the same configuration as the above-mentioned example in FIG. 3 will be omitted.

Referring to FIG. 3, a power supply system 100 for an aircraft may supply power to first to third motor devices 210 to 230.

The power supply system 100 of the aircraft may include a fuel cell 10, an auxiliary battery 20B, a converter device 30, a first battery device 51, a second battery device 52, and a processor 60.

The fuel cell 10 may electrochemically react fuel gas and oxygen to convert chemical energy into electrical energy.

An auxiliary battery device 20 may include the auxiliary battery 20B and a circuit device. The auxiliary battery 20B may make up for low responsiveness where the fuel cell 10 outputs a voltage.

The converter device 30 may boost a voltage output by the fuel cell 10 and may supply the boosted voltage to the first motor device 210 through a first output terminal Nout1.

Furthermore, the converter device 30 may distribute power generated by the fuel cell 10 to charge a first battery 51B and a second battery 52B, under control of the processor 60.

To this end, the converter device 30 may include a mode switch device 33 and first and second half-bridge converters.

The first half-bridge converter may include a pair of converter switches and a first inductor. The second half-bridge converter may include another pair of converter switches and a second inductor.

The mode switch device 33 may be selectively connected with an output node Ns of the fuel cell 10. In other words, under control of the processor 60, the mode switch device 33 may switch a connection between the output node Ns of the fuel cell 10 and the first half-bridge converter and may switch a connection between the output node Ns of the fuel cell 10 and the second half-bridge converter.

Furthermore, under control of the processor 60, the mode switch device 33 may switch a connection between the first output terminal Nout1 of the converter device 30 and a second output terminal Nout2 of the first battery device 51 and may switch a connection between the first output terminal Nout1 of the converter device 30 and a third output terminal Nout3 of the second battery device 52.

The first battery device 51 may include the first battery 51B and a first circuit device. The first circuit device may control a timing if the first battery 51B supplies a voltage to the second output terminal Nout2, under control of the processor 60.

The second battery device 52 may include the second battery 52B and a second circuit device. The second circuit device may control a timing if the second battery 52B supplies a voltage to the third output terminal Nout3, under control of the processor 60.

The processor 60 may set a driving mode for adjusting a path where the converter device 30 outputs a voltage depending on the altitude of the aircraft.

The processor 60 may set the driving mode to a first mode in a take-off duration and a landing duration.

The processor 60 may set the driving mode to a second mode in a cruising duration. In the second mode, the processor 60 may control the mode switch device 33 to disconnect the first and second half-bridge converters of the converter device 30 from the output node Ns of the fuel cell 10. Furthermore, in the second mode, the processor 60 may control the mode switch device 33 to connect the first half-bridge converter of the converter device with the second output terminal Nout2 of the first battery device 51 and connect the second half-bridge converter of the converter device 30 with the third output terminal Nout3 of the second battery device 52. As a result, in the cruising duration, the power supply system 100 may charge the first battery 51B and the second battery 52B using power of the fuel cell 10.

Figure 4:
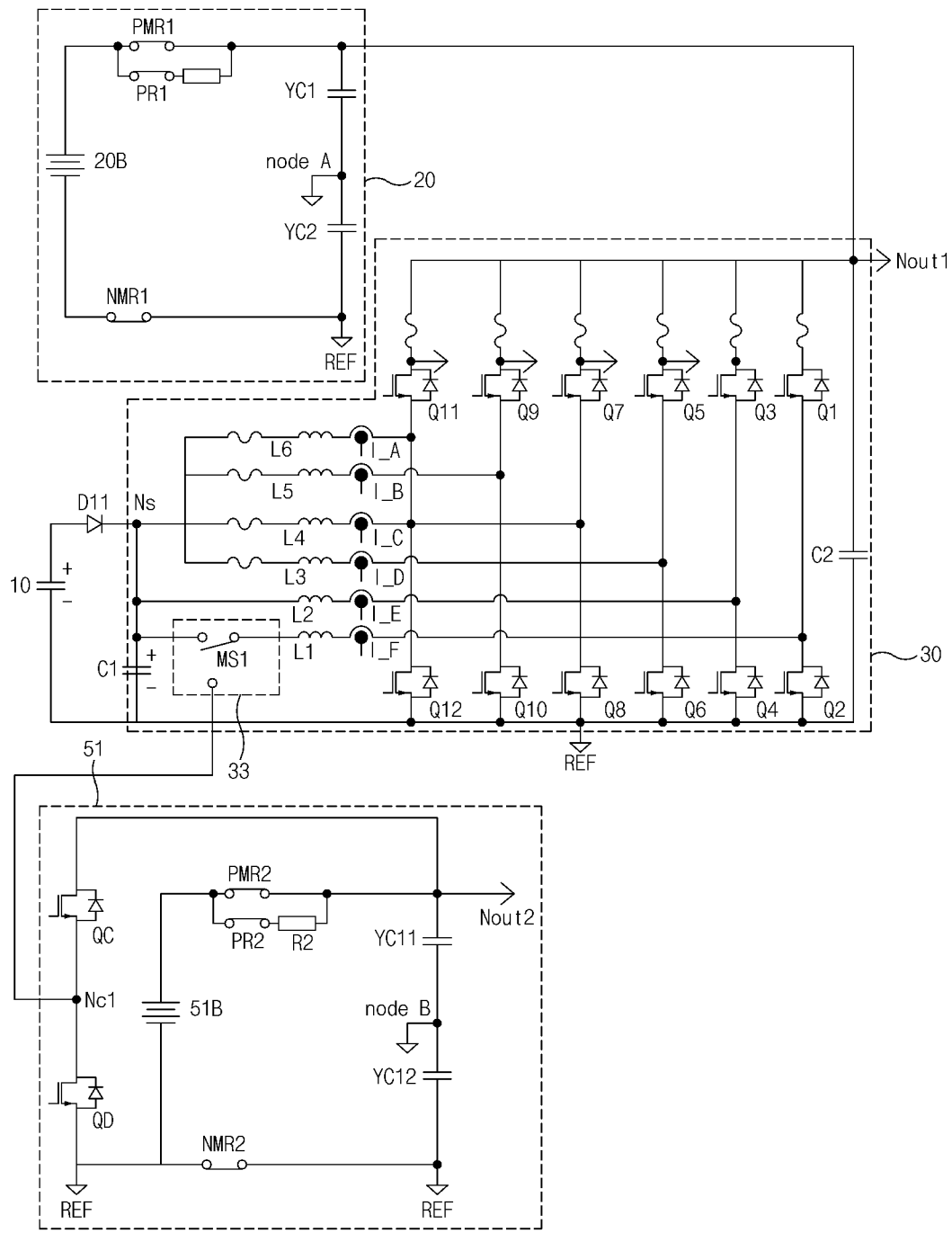
FIG. 4 shows an example circuit diagram for a power supply system for an aircraft.

FIG. 4 shows an example circuit diagram for a power supply system for an aircraft. FIG. 4 may be a circuit diagram of a power supply system for an aircraft shown in FIG. 1.

Referring to FIG. 4, a power supply system 100 of the aircraft may include an auxiliary battery device 20, a converter device 30, and a first battery device 51.

The auxiliary battery device 20 may include an auxiliary battery 20B and a circuit device for controlling a timing if a voltage of the auxiliary battery 20B is output to a first output terminal Nout1. The circuit device may include a first positive relay PMR1, a first negative relay NMR1, a first precharge relay PR1, a first Y capacitor YC1, and a second Y capacitor YC2.

A first electrode of the auxiliary battery 20B may be connected with the first output terminal Nout1, and a second electrode of the auxiliary battery 20B may be connected with the reference node. The first electrode may be referred to as a positive electrode, and the second electrode may be referred to as a negative electrode. The first Y capacitor YC1 and the second Y capacitor YC2 may be connected in series with each other between the first output terminal Nout1 and the reference node. A node between the first Y capacitor YC1 and the second Y capacitor YC2 may be connected with a node A (e.g., a node, such as a second neutral node, which has a voltage potential different from the reference voltage potential of the reference node). If the reference node is not connected to a chassis, the node A may be connected to the chassis. If the reference node is connected to the chassis, the node A may not be connected to the chassis. The first Y capacitor YC1 and the second Y capacitor YC2 may be for noise cancellation and interference suppression.

The first positive relay RMR1 may be connected between the first electrode of the auxiliary battery 20B and the first output terminal Nout1, and the first negative relay NMR1 may be connected between the second electrode of the auxiliary battery 20B and the reference node. The first precharge relay PR1 may be connected in parallel with the first positive relay RMR1, and a precharge resistor may be connected in series with the first precharge relay PR1.

The converter device 30 may include first to sixth half-bridge converters, a first link capacitor C1, and a second link capacitor C2. The first half-bridge converter may include a first switching device (Q1 and Q2) and a first inductor L1. The second half-bridge converter may include a second switching device (Q3 and Q4) and a second inductor L2. The third half-bridge converter may include a third switching device (Q5 and Q6) and a third inductor L3. The fourth half-bridge converter may include a fourth switching device (Q7 and Q8) and a fourth inductor L4. The fifth half-bridge converter may include the first switching device (Q1 and Q2) and a fifth inductor L5. The sixth half-bridge converter may include the first switching device (Q1 and Q2) and a sixth inductor L6.

The first to sixth switching devices may alternately switch a voltage through a rectifier diode D11 from the fuel cell 10.

Each of the first to sixth switching devices may include a pair of converter switches which are connected in series with each other between the first output terminal Nout1 and the reference node. For example, the first switching device (Q1 and Q2) may include the first converter switch Q1 and the second converter switch Q2, which are connected in series with each other between the first output terminal Nout1 and the reference node. The second switching device (Q3 and Q4) may include the third converter switch Q3 and the fourth converter switch Q4, which are connected in series with each other between the first output terminal Nout1 and the reference node. The third switching device (Q5 and Q6) may include the fifth converter switch Q5 and the sixth converter switch Q6, which are connected in series with each other between the first output terminal Nout1 and the reference node. The fourth switching device (Q7 and Q8) may include the seventh converter switch Q7 and the eighth converter switch Q8, which are connected in series with each other between the first output terminal Nout1 and the reference node. The fifth switching device (Q9 and Q10) may include the ninth converter switch Q9 and the tenth converter switch Q10, which are connected in series with each other between the first output terminal Nout1 and the reference node. The sixth switching device (Q11 and Q12) may include the eleventh converter switch Q11 and the twelfth converter switch Q12, which are connected in series with each other between the first output terminal Nout1 and the reference node.

The mode switch device 33 may use a first mode switch MS1.

The first mode switch MS1 may switch a connection between the output node Ns of the fuel cell 10 and the first half-bridge converter. Furthermore, the first mode switch MS1 may switch a connection between the first half-bridge converter and the second output terminal Nout2. To this end, the first mode switch MS1 may be a single pole double throw (SPDT) relay which connects the first inductor L1 with a cathode of the rectifier diode D11 or the second output terminal Nout2.

The first battery device 51 may be coupled with a converter device 30, and may include a first battery 51B and a circuit device for controlling a timing if a voltage of the first battery 51B is output to the second output terminal Nout2. The circuit device may include a second positive relay PMR2, a second negative relay NMR2, a second precharge relay PR2, an eleventh Y capacitor YC11, and a twelfth Y capacitor YC12.

The converter device 30 may include a first auxiliary converter switch QC and a second auxiliary converter switch QD. The first auxiliary converter switch QC and the second auxiliary converter switch QD may be connected in series with each other between the second output terminal Nout2 and the reference node. A node between the first auxiliary converter switch QC and the second auxiliary converter switch QD may be connected with a node between the first mode switch MS1 and the first inductor L1.

A first electrode of the first battery 51B may be connected with the second output terminal Nout2, and a second electrode of the first battery 51B may be connected with the reference node. The first electrode may be referred to as a positive electrode, and the second electrode may be referred to as a negative electrode. The eleventh Y capacitor YC11 and the twelfth Y capacitor YC12 may be connected in series with each other between the second output terminal Nout2 and the reference node. A node between the eleventh Y capacitor YC11 and the twelfth Y capacitor YC12 may be connected with the reference node. The eleventh Y capacitor YC11 and the twelfth Y capacitor YC12 may be for noise cancellation and interference suppression.

The second positive relay RMR2 may be connected between the first electrode of the first battery 51B and the second output terminal Nout2, and the second negative relay NMR2 may be connected between the second electrode of the first battery 51B and the reference node. A second precharge relay PR2 may be connected in parallel with the second positive relay RMR2, and a second precharge resistor R2 may be connected in series with the second precharge relay PR2.

Figure 5:
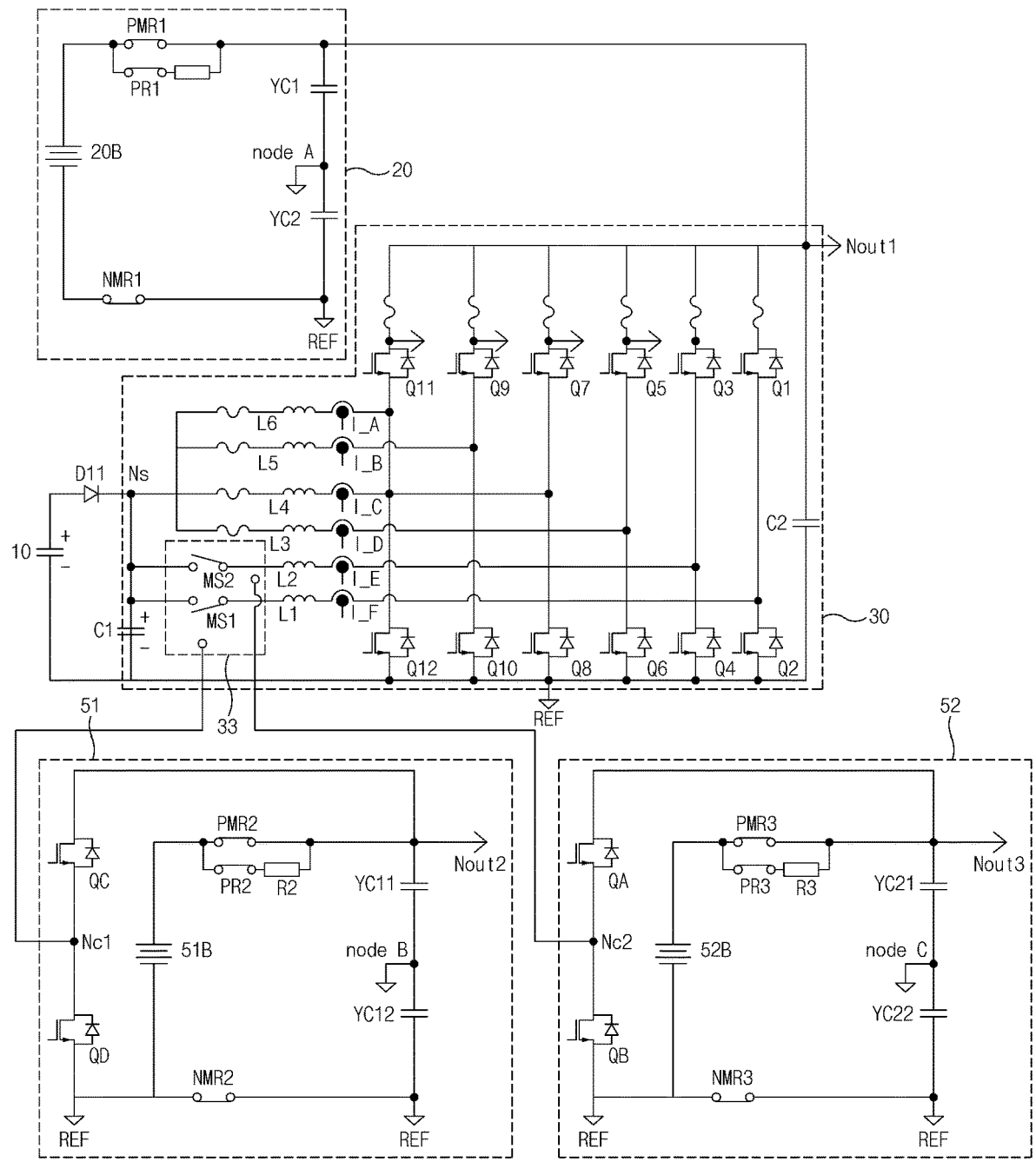
FIG. 5 shows an example circuit diagram for a power supply system for an aircraft.

FIG. 5 shows an example circuit diagram for a power supply system for an aircraft. FIG. 5 may be a circuit diagram a power supply system shown in FIG. 3. A detailed description of substantially the same configuration as the above-described features will be omitted.

Referring to FIG. 5, a power supply system 100 of the aircraft may include an auxiliary battery device 20, a converter device 30, a first battery device 51, and a second battery device 52.

The auxiliary battery device 20 may include an auxiliary battery 20B and a circuit device for controlling a timing if a voltage of the auxiliary battery 20B is output to a first output terminal Nout1. The circuit device may include a first positive relay PMR1, a first negative relay NMR1, a first precharge relay PR1, a first Y capacitor YC1, and a second Y capacitor YC2.

The converter device 30 may include first to sixth half-bridge converters, a first link capacitor C1, and a second link capacitor C2. The first half-bridge converter may include a first switching device (Q1 and Q2) and a first inductor L1. The second half-bridge converter may include a second switching device (Q3 and Q4) and a second inductor L2. The third half-bridge converter may include a third switching device (Q5 and Q6) and a third inductor L3. The fourth half-bridge converter may include a fourth switching device (Q7 and Q8) and a fourth inductor L4. The fifth half-bridge converter may include the first switching device (Q1 and Q2) and a fifth inductor L5. The sixth half-bridge converter may include the first switching device (Q1 and Q2) and a sixth inductor L6.

The first to sixth switching devices may alternately switch a voltage through a rectifier diode D11 from a fuel cell 10.

Each of the first to sixth switching devices may include a pair of converter switches which are connected in series with each other between a first output terminal Nout1 and the reference node. For example, the first switching device (Q1 and Q2) may include the first converter switch Q1 and the second converter switch Q2, which are connected in series with each other between the first output terminal Nout1 and the reference node. The second switching device (Q3 and Q4) may include the third converter switch Q3 and the fourth converter switch Q4, which are connected in series with each other between the first output terminal Nout1 and the reference node. The third switching device (Q5 and Q6) may include the fifth converter switch Q5 and the sixth converter switch Q6, which are connected in series with each other between the first output terminal Nout1 and the reference node. The fourth switching device (Q7 and Q8) may include the seventh converter switch Q7 and the eighth converter switch Q8, which are connected in series with each other between the first output terminal Nout1 and the reference node. The fifth switching device (Q9 and Q10) may include the ninth converter switch Q9 and the tenth converter switch Q10, which are connected in series with each other between the first output terminal Nout1 and the reference node. The sixth switching device (Q11 and Q12) may include the eleventh converter switch Q11 and the twelfth converter switch Q12, which are connected in series with each other between the first output terminal Nout1 and the reference node.

A mode switch device 33 may include a first mode switch MS1 and a second mode switch MS2.

The first mode switch MS1 may be a single pole double throw (SPDT) relay which connects the first inductor L1 with a cathode of the rectifier diode D11 or a second output terminal Nout2.

The second mode switch MS2 may be a single pole double throw (SPDT) relay which connects the second inductor L2 with a cathode of the rectifier diode D11 or a third output terminal Nout3.

The first battery device 51 may be coupled with a converter device 30, and may include a first battery 51B and a circuit device for controlling a timing if a voltage of the first battery 51B is output to the second output terminal Nout2. The circuit device may include a second positive relay PMR2, a second negative relay NMR2, a second precharge relay PR2, an eleventh Y capacitor YC11, and a twelfth Y capacitor YC12.

A first electrode of the first battery 51B may be connected with the second output terminal Nout2, and a second electrode of the first battery 51B may be connected with the reference node. The first electrode may be referred to as a positive electrode, and the second electrode may be referred to as a negative electrode.

The second battery device 52 may be coupled with a converter device 30, and may include a second battery 52B, and a circuit device for controlling a timing if a voltage of the second battery 52B is output to the third output terminal Nout3. The circuit device may include a third positive relay PMR3, a third negative relay NMR3, a third precharge relay PR3, a 21st Y capacitor YC21, and a 22nd Y capacitor YC22.

The converter device 30 may include a third auxiliary converter switch QA and a fourth auxiliary converter switch QB. The third auxiliary converter switch QA and the fourth auxiliary converter switch QB may be connected in series with each other between the third output terminal Nout3 and the reference node. A node between the third auxiliary converter switch QA and the fourth auxiliary converter switch QB may be connected with a node between the second mode switch MS2 and the second inductor L2.

A first electrode of the second battery 52B may be connected with the third output terminal Nout3, and a second electrode of the second battery 52B may be connected with the reference node. The first electrode may be referred to as a positive electrode, and the second electrode may be referred to as a negative electrode. The 21st Y capacitor YC21 and the 22nd Y capacitor YC22 may be connected in series with each other between the third output terminal Nout3 and the reference node. A node between the 21st Y capacitor YC21 and the 22nd Y capacitor YC22 may be connected with the reference node. The 21st Y capacitor YC21 and the 22nd Y capacitor YC22 may be for noise cancellation and interference suppression.

The third positive relay RMR3 may be connected between the first electrode of the second battery 52B and the third output terminal Nout3, and the third negative relay NMR3 may be connected between the second electrode of the second battery 52B and the reference node. The third precharge relay PR3 may be connected in parallel with the third positive relay RMR3, and a third precharge resistor may be connected in series with the third precharge relay RP3.

Figure 6:
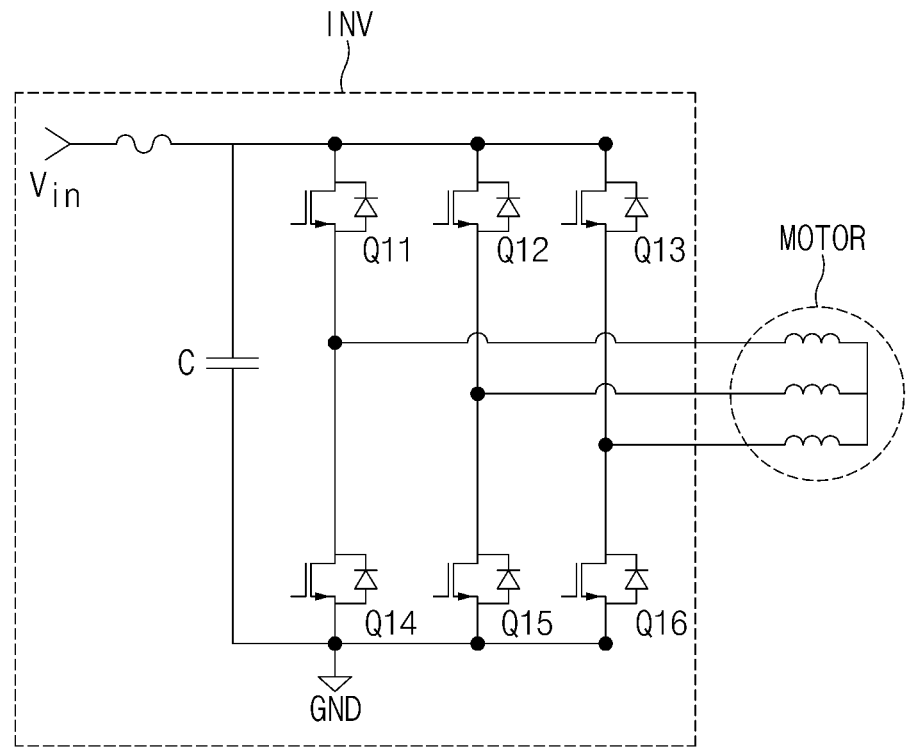
FIG. 6 shows an example circuit diagram for a monitor device.

FIG. 6 shows an example circuit diagram for a monitor device.

Referring to FIG. 6, each of a first motor device 210 and a second motor device 220 may include an inverter INV for driving a motor.

The inverter INV may include a U-phase voltage generator (Q11 and Q14), a V-phase voltage generator (Q12 and Q15), and a W-phase voltage generator (Q13 and Q16) for converting an input voltage into a three-phase voltage and supplying the three-phase voltage to the motor. An output terminal of each of the voltage generators may be connected with a three-phase voltage input terminal of the motor.

An input voltage Vin may be a voltage supplied from a first output terminal Nout1 of a converter device 30, a first output terminal Nout1 of a first battery device 51, or a second output terminal Nout2 of a second battery device 52.

Figure 7:
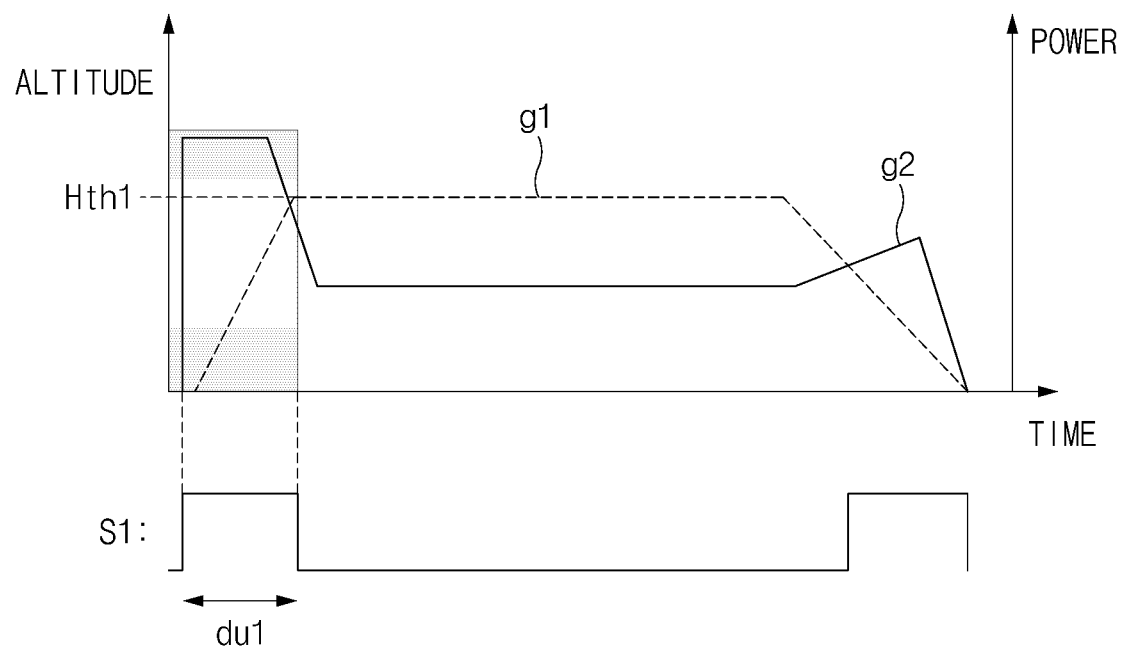
FIG. 7 shows an example of a control signal in a take-off duration.
Figure 10:
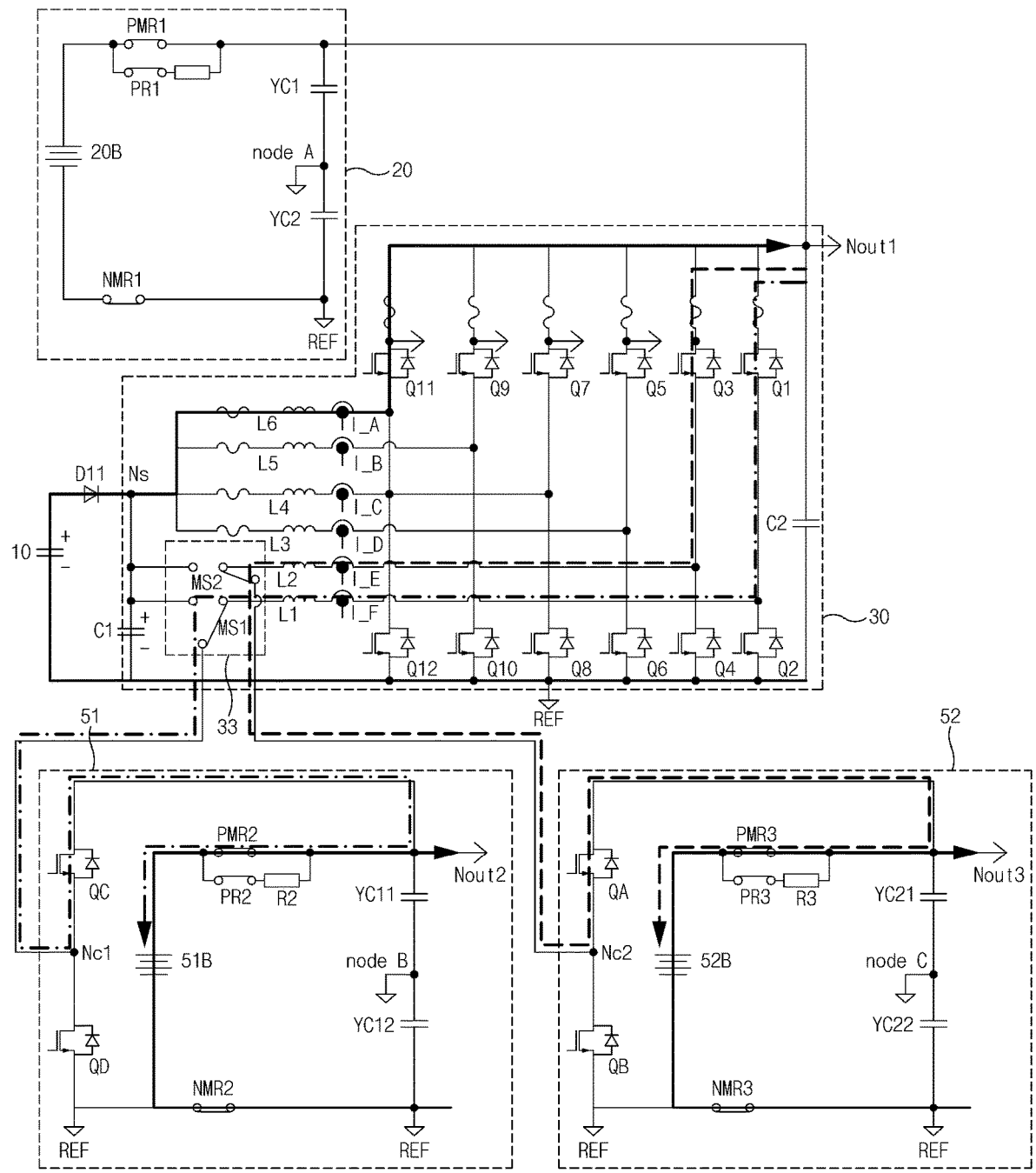
FIG. 10 shows an example of power output by a power supply system in a cruising duration.
Figure 11:
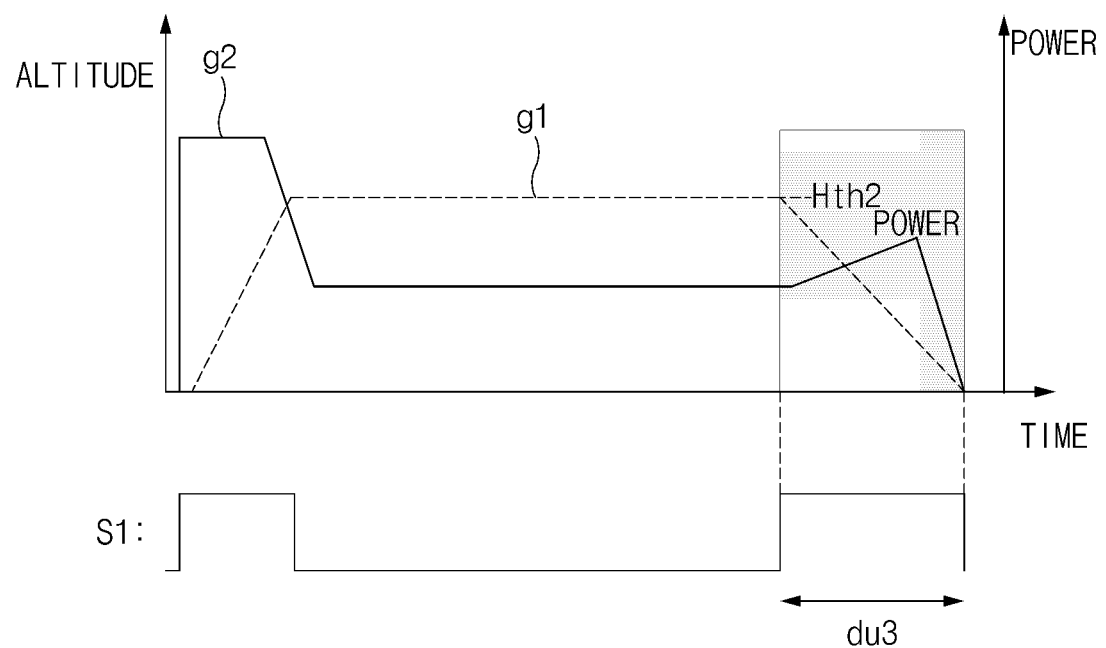
FIG. 11 shows an example of power output by a power supply system in a landing duration.

Hereinafter, a description will be given of a control method of a power supply system for an aircraft with reference to FIGS. 7 and 11. FIGS. 7 to 11 describe a control method of a power supply system for an aircraft according to an example shown in FIG. 5.

Figure 8:
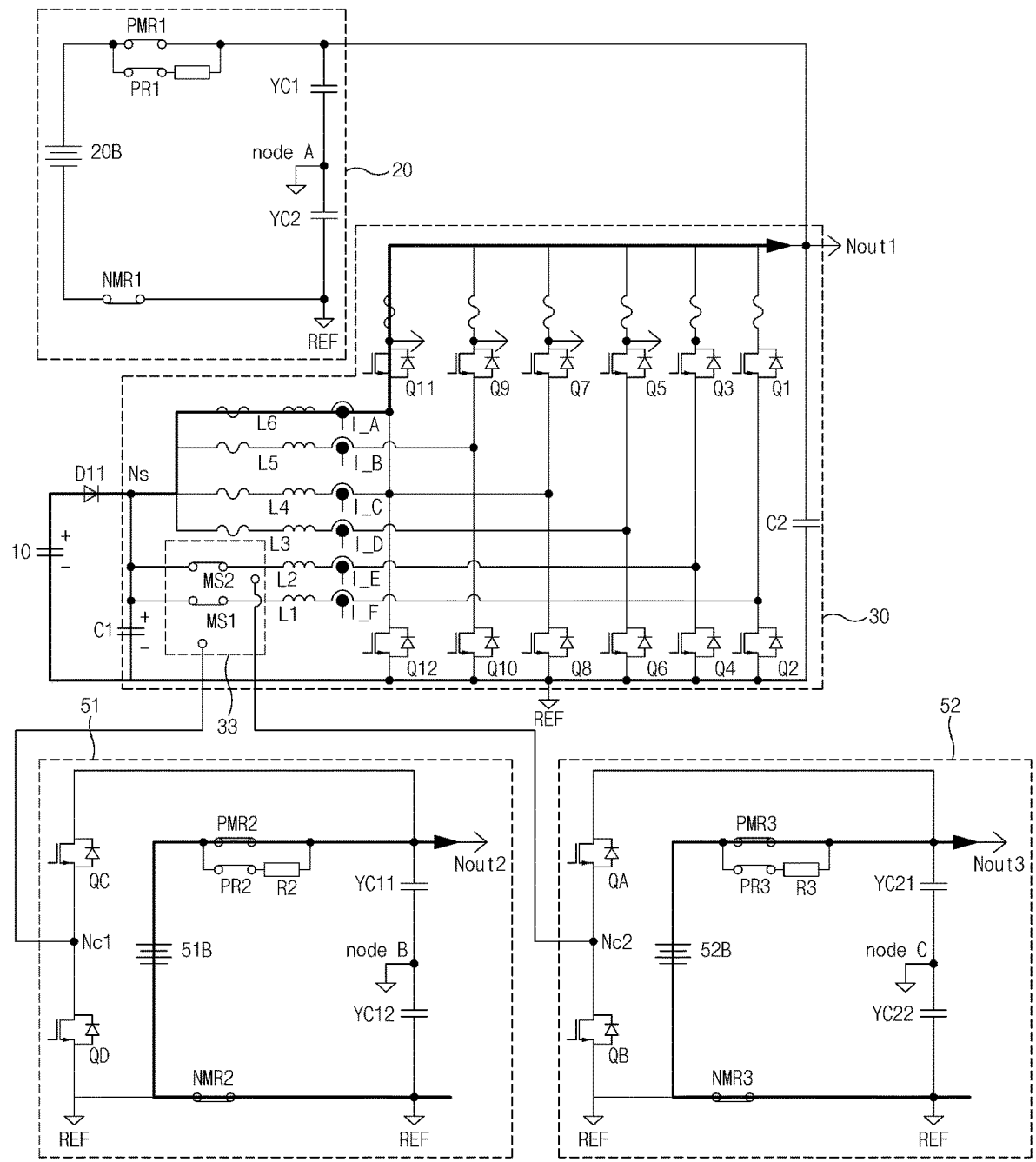
FIG. 8 shows an example of power output by a power supply system in a take-off duration.

FIG. 7 shows an example of a control signal in a take-off duration. In FIG. 7, g1 is a graph illustrating a change in altitude over time, and g2 is a drawing illustrating power over time. In FIG. 7, the power may refer to thrust required by the aircraft. FIG. 8 shows an example of power output by a power supply system in a take-off duration.

Referring to FIGS. 7 and 8, in a take-off duration, a processor 60 may operate a power supply system 100.

The processor 60 may operate an auxiliary battery device in response to that the aircraft is turned on.

To this end, in a state where a first positive relay PMR1 is opened, the processor 60 may close a first precharge relay PR1 and a first negative relay NMR1. Thus, a first output terminal Nout1 may be precharged with a link voltage.

Next, in the state where the first negative relay NMR1 is closed, the processor 60 may open the first precharge relay PR1 and may close the first positive relay PMR1, thus supplying a voltage of the auxiliary battery 20B to the first output terminal Nout1.

As such, the processor 60 may supply the voltage to the first output terminal Nout1 through the auxiliary battery device 20, thus increasing responsiveness where the power supply system supplies power at the moment if power required by the aircraft increases rapidly.

Furthermore, the processor 60 may output a first control signal S1 as a high-level voltage to drive the power supply system based on a first mode in response to that the aircraft is turned on. The first control signal S1 of the high-level voltage may be a signal for controlling a first mode switch MS1 to connect a first inductor L1 with an output node of a fuel cell 10. If the first mode switch MS1 is controlled by a magnetic field caused by a coil (not shown) for relay control, the first control signal S1 may be a signal for controlling current flow in the coil for relay control. As a result, in response to the first control signal S1, the first mode switch MS1 may connect the first inductor L1 with the output node Ns of the fuel cell 10.

Furthermore, in response to the first control signal S1, the second mode switch MS2 may connect the second inductor L2 with the output node Ns of the fuel cell 10.

As the first inductor L1 and the output node Ns of the fuel cell 10 are connected with each other, a first half-bridge converter including a first converter switch Q1, a second converter switch Q2, and a first inductor L1 may boost and supply a voltage generated by the fuel cell 10 to the first output terminal Nout1.

Furthermore, as the second inductor L2 and the output node Ns of the fuel cell 10 are connected with each other, a second half-bridge converter including a third converter switch Q3, a fourth converter switch Q4, and a second inductor L2 may boost and supply the voltage generated by the fuel cell 10 to the first output terminal Nout1.

As a result, in the take-off duration du1, a converter device 30 may supply a voltage output by the fuel cell 10 to a first motor device 210 through the first output terminal Nout1. In the take-off duration du1, a second link voltage $V_{C2}$ may be determined by an output node voltage of the fuel cell 10 and a turn-on duty ratio of converter switches. In detail, the second link voltage $V_{C2}$ (the voltage across the capacitor C2) may be represented as Equation 1 below.

$$V_{C2} = \frac{V_{C1}}{1-D1} \quad \text{[Equation 1]}$$

In Equation 1 above, $V_{C1}$ (the voltage across the capacitor C1) may refer to the first link voltage, and D1 may refer to the turn-on duty ratio of the second converter switch Q2, the fourth converter switch Q4, the sixth converter switch Q6, the eighth converter switch Q8, and the twelfth converter switch Q12.

Furthermore, in the take-off duration du1, a first battery device 51 may supply a voltage to a second motor device 220.

To this end, in a state where a second positive relay PMR2 is opened, the processor 60 may close a second precharge relay PR2 and a second negative relay NMR2. Thus, a second output terminal Nout2 may be precharged with a link voltage.

Next, in the state where the second negative relay NMR2 is closed processor 60 may open the second precharge relay PR2 and may close the second positive relay PMR2, thus supplying a voltage of the first battery 51B to a second output terminal Nout2.

Furthermore, in the take-off duration du1, a second battery device 52 may supply a voltage to a third motor device 230.

To this end, in a state where a third positive relay PMR3 is opened, the processor 60 may close a third precharge relay PR3 and a third negative relay NMR3. Thus, a third output terminal Nout3 may be precharged with a link voltage.

Next, in the state where the third negative relay NMR3 is closed, the processor 60 may open the third precharge relay PR3 and may close the third positive relay PMR3, thus supplying a voltage of the second battery 52B to a third output terminal Nout3.

Figure 9:
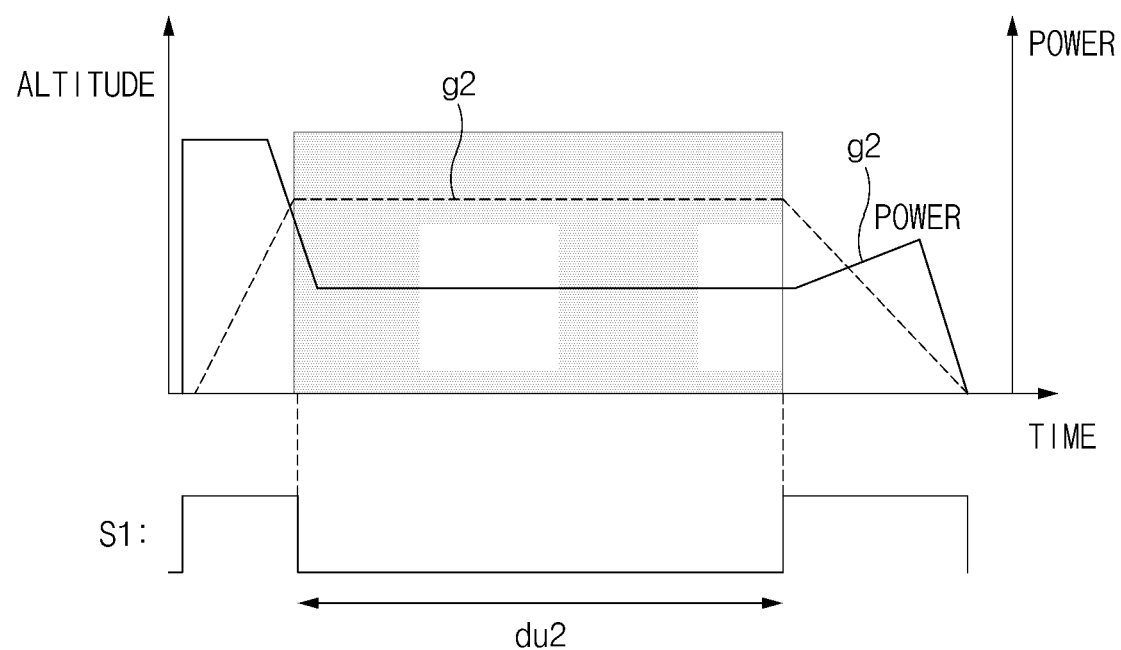
FIG. 9 shows an example of a control signal in a flight duration.

FIG. 9 is a drawing illustrating a first control signal in a flight duration. FIG. 10 is a drawing illustrating power of a power supply system in a cruising duration.

Referring to FIGS. 9 and 10, a processor 60 may monitor altitude information for an aircraft.

If the aircraft ascends above a predetermined first threshold altitude Hth1, the processor 60 may determine that it enters a cruising duration du2.

In the cruising duration du2, the processor 60 may output a first control signal S1 as a low-level voltage to drive a power supply system based on a second mode. The first control signal S1 of the low-level voltage may be to connect a first inductor L1 with a node between a first auxiliary converter switch QC and a second auxiliary converter switch QD. At the same time, the first inductor L1 and an output node of a fuel cell 10 may be disconnected from each other by the first control signal S1 of the low-level voltage. Thus, a first converter switch Q1, a second converter switch Q2, the first inductor L1, the first auxiliary converter switch QC, and the second auxiliary converter switch QD may form a first H bridge converter.

The voltage of a first output terminal Nout1 may be supplied to a first battery 51B through a second output terminal Nout2, using the first H bridge converter. Thus, the first battery 51B may be charged based on the voltage from the first output terminal Nout1.

The voltage charged in the first battery 51B may be proportional to a second link voltage $V_{C2}$ and a duty ratio. In other words, the voltage charged in the first battery 51B may be represented as Equation 2 below.

$$V_{51B} = V_{C2} \times D2 \quad \text{[Equation 2]}$$

In Equation 2 above, $V_{51B}$ may refer to the magnitude of the voltage charged in the first battery 51B, and D2 may refer to the turn-on duty ratio of the first converter switch Q1 and the first auxiliary converter switch QC.

Thus, the processor 60 may determine the turn-on duty ratio of the first converter switch Q1 and the first auxiliary converter switch QC to determine a magnitude of the voltage distributed to the second output terminal Nout2.

Furthermore, in response to the first control signal S1, a second mode switch MS2 may connect a second inductor L2 with a third output terminal Nout3. Thus, a third converter switch Q3, a fourth converter switch Q4, the second inductor L2, a third auxiliary converter switch QA, and a fourth auxiliary converter switch QB may form a second H bridge converter.

The voltage of the first output terminal Nout1 may be supplied to a second battery 52B through the third output terminal Nout3, using the second H bridge converter. Thus, the second battery 52B may be charged based on the voltage from the first output terminal Nout1.

The voltage charged in the second battery 52B may be proportional to a second link voltage $V_{C2}$ and a duty ratio. In other words, the voltage charged in the second battery 52B may be represented as Equation 3 below.

$$V_{52B} = V_{C2} \times D3 \quad \text{[Equation 3]}$$

In Equation 3 above, $V_{52B}$ may refer to the magnitude of the voltage charged in the second battery 52B, and D3 may refer to the turn-on duty ratio of the third converter switch Q3 and the third auxiliary converter switch QA.

Thus, the processor 60 may determine the turn-on duty ratio of the third converter switch Q3 and the third auxiliary converter switch QA to determine a magnitude of the voltage distributed to the third output terminal Nout3.

As a result, in the cruising duration dug, a converter device 30 may distribute the voltage output by the fuel cell 10 to the first output terminal Nout1 and the second output terminal Nout2.

FIG. 11 is a drawing illustrating power of a power supply system in a landing duration.

If the aircraft descends below a predetermined second threshold altitude Hth2, a processor 60 may determine that it enters a landing duration du3. The second threshold altitude Hth2 may be set to an altitude which is the same as or different from a first threshold altitude Hth1.

In the landing duration du3, the processor 60 may output a first control signal S1 as a high-level voltage to drive a power supply system based on a first mode.

As a result, in the landing duration du3, the power supply system may operate to be the same as that shown in FIG. 8.

Figure 12:
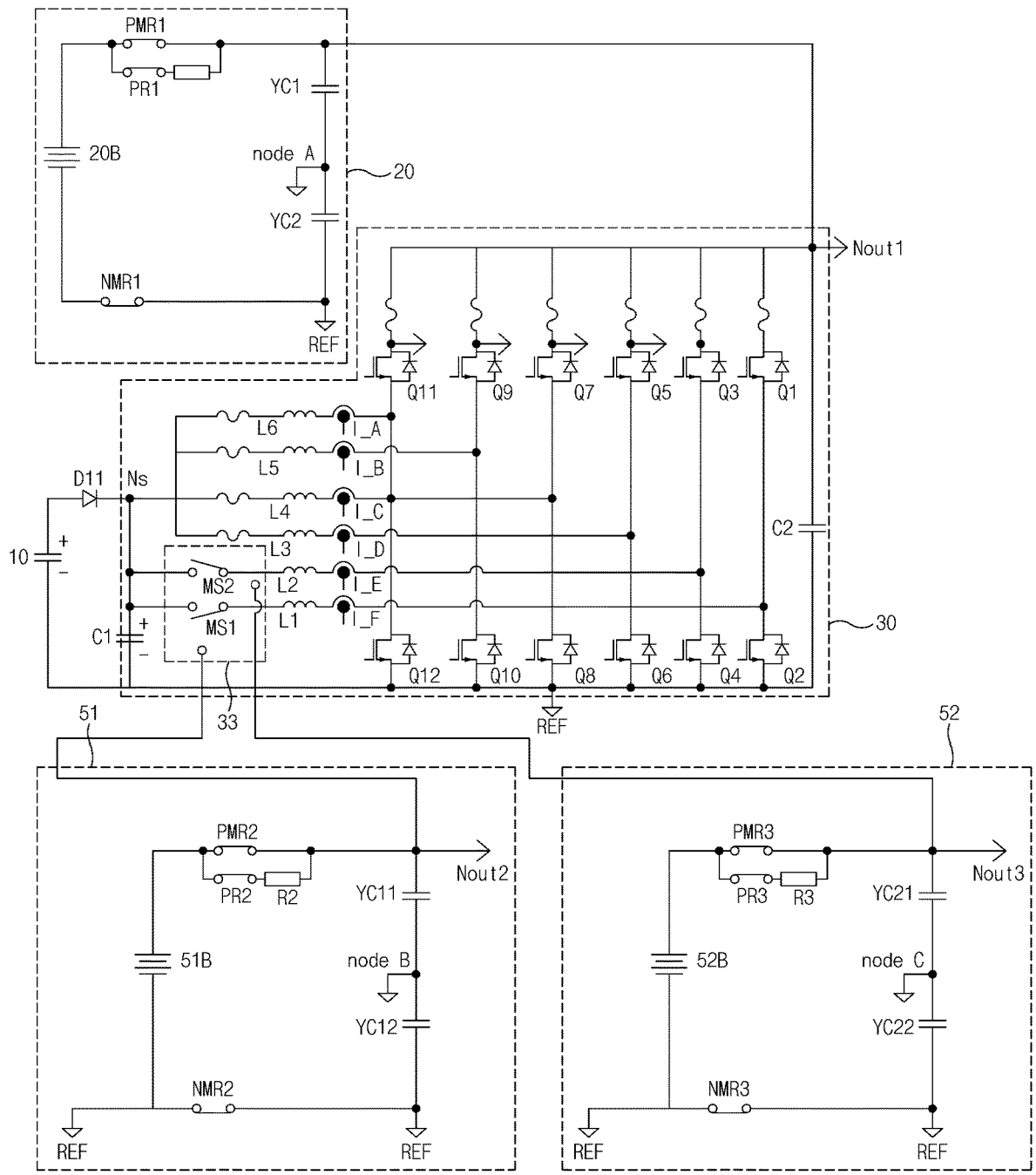
FIG. 12 shows an example circuit diagram for a power supply system.

FIG. 12 shows an example circuit diagram for a power supply system. FIG. 12 may be a circuit diagram of a power supply system shown in FIG. 3. A detailed description of substantially the same configuration as the above-mentioned examples in the description of FIG. 12 will be omitted. Unlike the above figures, switches QA, QB, QC, and QD are omitted in FIG. 12. Thus, in FIG. 12, the first mode switch MS1 may connect the first inductor L1 with the second output terminal Nout2, and the second mode switch MS2 may connect the second inductor L2 with the third output terminal Nout3.

Referring to FIG. 12, a power supply system 100 for an aircraft may include an auxiliary battery device 20, a converter device 30, a first battery device 51, and a second battery device 52.

The auxiliary battery device 20 may include an auxiliary battery 20B and a circuit device for controlling a timing if a voltage of the auxiliary battery 20B is output to a first output terminal Nout1.

The converter device 30 may include first to sixth half-bridge converters, a first link capacitor C1, and a second link capacitor C2. The first half-bridge converter may include a first switching device (Q1 and Q2) and a first inductor L1. The second half-bridge converter may include a second switching device (Q3 and Q4) and a second inductor L2. The third half-bridge converter may include a third switching device (Q5 and Q6) and a third inductor L3. The fourth half-bridge converter may include a fourth switching device (Q7 and Q8) and a fourth inductor L4. The fifth half-bridge converter may include the first switching device (Q1 and Q2) and a fifth inductor L5. The sixth half-bridge converter may include the first switching device (Q1 and Q2) and a sixth inductor L6.

A mode switch device 33 may include a first mode switch MS1 and a second mode switch MS2.

The first mode switch MS1 may be a single pole double throw (SPDT) relay which connects the first inductor L1 with a cathode of a rectifier diode D11 or a second output terminal Nout2. The second mode switch MS2 may be a single pole double throw (SPDT) relay which connects the second inductor L2 with a cathode of the rectifier diode D11 or a third output terminal Nout3.

The first battery device 51 may include a first battery 51B and a circuit device for controlling a timing if a voltage of the first battery 51B is output to the second output terminal Nout2. The circuit device may include a second positive relay PMR2, a second negative relay NMR2, a second precharge relay PR2, an eleventh Y capacitor YC11, and a twelfth Y capacitor YC12.

The second battery device 52 may include a second battery 52B and a circuit device for controlling a timing if a voltage of the second battery 52B is output to the third output terminal Nout3. The circuit device may include a third positive relay PMR3, a third negative relay NMR3, a third precharge relay PR3, a 21st Y capacitor YC21, and a 22nd Y capacitor YC22.

The operation of the mode switch device 33 in the example shown in FIG. 12 may switch according to the same procedure as that those shown in FIGS. 7 to 11.

A description will be given of a driving mode in the example shown in FIG. 12.

In a first mode, a processor 60 may control the first mode switch MS1 such that the first inductor L1 is connected with an output node of a fuel cell 10. Furthermore, the processor 60 may control the second mode switch MS2 such that the second inductor L2 is connected with the output node Ns of the fuel cell 10.

Thus, a converter device 30 may supply power generated by the fuel cell 10 to a first motor device 210 through the first output terminal Nout1. Furthermore, the first battery device 51 may supply a voltage of the first battery 51B to a second motor device 220 through the second output terminal Nout2, and the second battery device 52 may supply a voltage of the second battery 52B to a third motor device 230 through the third output terminal Nout3.

In a second mode, the processor 60 may control the first mode switch MS1 such that the first inductor L1 is connected with the second output terminal Nout2. At the same time, the processor 60 may disconnect the first inductor L1 from the output node Ns of the fuel cell 10. Thus, the first inductor L1, the first converter switch Q1, and the second converter switch Q2 may perform a function of a buck converter which supplies a second link voltage $V_{C2}$ to the second output terminal Nout2.

Furthermore, In the second mode, the processor 60 may control the second mode switch MS2 such that the second inductor L2 is connected with the third output terminal Nout3. At the same time, the processor 60 may disconnect the second inductor L2 from the output node Ns of the fuel cell 10. Thus, the second inductor L2, the third converter switch Q3, and the fourth converter switch Q4 may perform a function of a buck converter which supplies the second link voltage to the third output terminal Nout3.

Thus, in the second mode, the converter device 30 may distribute the voltage of the first output terminal Nout1 to the second output terminal Nout2 and the third output terminal Nout3.

The first and second battery devices 51 and 52 shown in FIG. 12 may be applicable to an example shown in FIG. 4. In other words, in the first battery device 51 shown in the example of FIG. 4, a first auxiliary converter switch QC and a second auxiliary converter switch QD may be omitted and the second output terminal Nout2 may be connected with the first inductor L1 through the first mode switch MS1.

Figure 13:
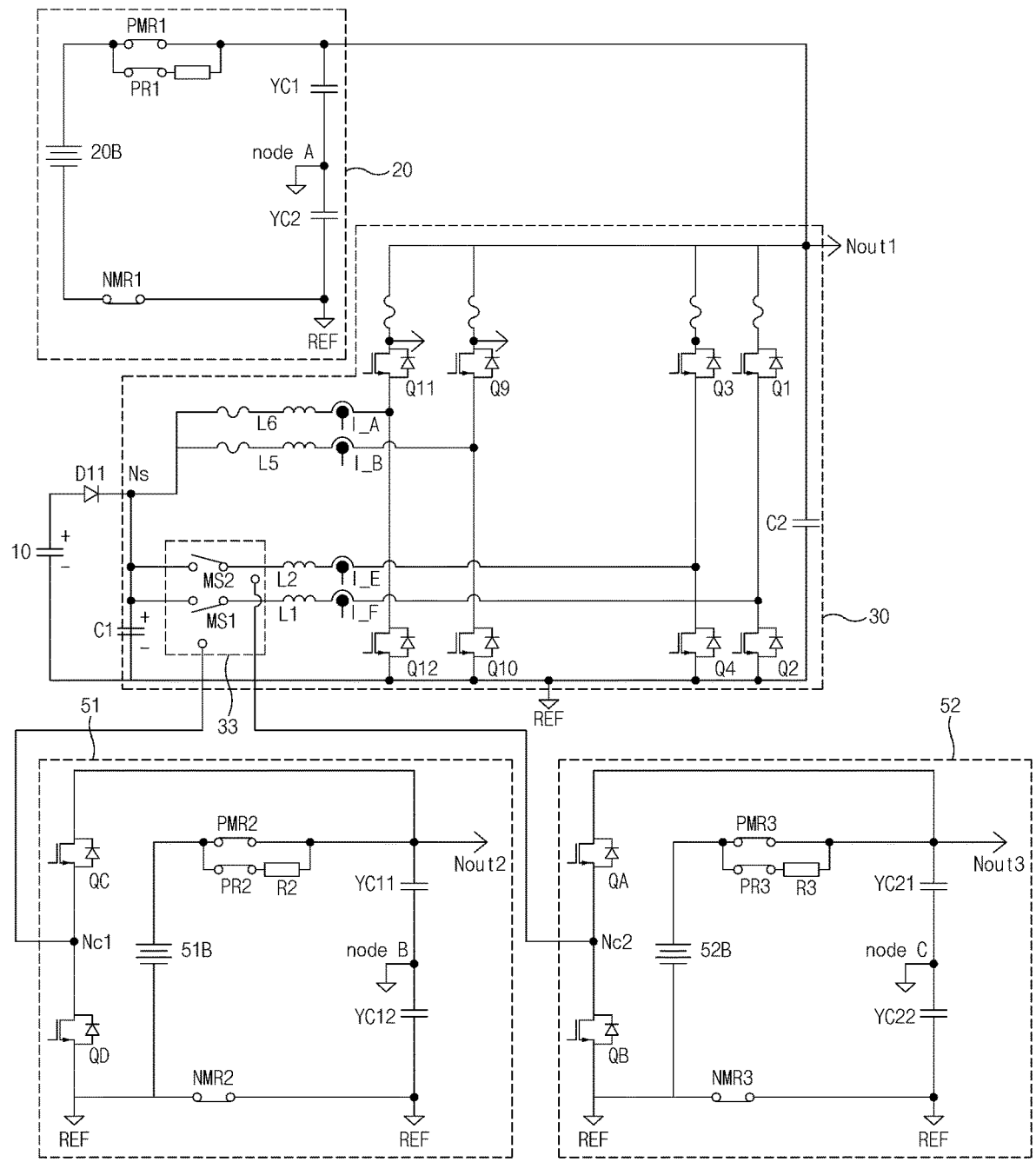
FIG. 13 shows an example circuit diagram for a power supply system.

FIG. 13 shows another example circuit diagram for a power supply system. FIG. 13 may be a circuit diagram of a power supply system shown in FIG. 3. A detailed description of substantially the same configuration as the above-mentioned examples in the description of FIG. 13 will be omitted.

Referring to FIG. 13, a power supply system 100 for an aircraft may include an auxiliary battery device 20, a converter device 30, a first battery device 51, and a second battery device 52.

The auxiliary battery device 20 may include an auxiliary battery 20B and a circuit device for controlling a timing if a voltage of the auxiliary battery 20B is output to a first output terminal Nout1. The circuit device may include a first positive relay PMR1, a first negative relay NMR1, a first precharge relay PR1, a first Y capacitor YC1, and a second Y capacitor YC2.

The converter device 30 may include first and second half-bridge converters, fifth and sixth half-bridge converters, a first link capacitor C1, and a second link capacitor C2. The first half-bridge converter may include a first switching device (Q1 and Q2) and a first inductor L1. The second half-bridge converter may include a second switching device (Q3 and Q4) and a second inductor L2. The fifth half-bridge converter may include a fifth switching device (Q9 and Q10) and a fifth inductor L5. The sixth half-bridge converter may include a sixth switching device (Q11 and Q12) and a sixth inductor L6.

The first and second switching devices and the fifth and sixth switching devices may alternately switch a voltage through a rectifier diode D11 from a fuel cell 10.

A mode switch device 33 may include a first mode switch MS1 and a second mode switch MS2.

The first mode switch MS1 may be a single pole double throw (SPDT) relay which connects the first inductor L1 with a cathode of the rectifier diode D11 or a second output terminal Nout2. The second mode switch MS2 may be a single pole double throw (SPDT) relay which connects the second inductor L2 with a cathode of the rectifier diode D11 or a third output terminal Nout3.

The first battery device 51 may be coupled with a first auxiliary converter device 30, and may include a first battery 51B and a circuit device for controlling a timing if a voltage of the first battery 51B is output to the second output terminal Nout2. The circuit device may include a second positive relay PMR2, a second negative relay NMR2, a second precharge relay PR2, an eleventh Y capacitor YC11, and a twelfth Y capacitor YC12.

The second battery device 52 may be coupled with a converter device 30, and may include a second battery 52B, and a circuit device for controlling a timing if a voltage of the second battery 52B is output to the third output terminal Nout3. The circuit device may include a third positive relay PMR3, a third negative relay NMR3, a third precharge relay PR3, a 21st Y capacitor YC21, and a 22nd Y capacitor YC22.

The operation of the mode switch device 33 in the example shown in FIG. 13 may switch according to the same procedure as those shown in FIGS. 7 to 11.

A description will be given of a driving mode in the example shown in FIG. 13.

In a first mode, a processor 60 may control the first mode switch MS1 such that the first inductor L1 is connected with an output node Ns of the fuel cell 10. Furthermore, the processor 60 may control the second mode switch MS2 such that the second inductor L2 is connected with the output node Ns of the fuel cell 10. Thus, a converter device 30 may supply power generated by the fuel cell 10 to a first motor device 210 through the first output terminal Nout1. Furthermore, the first battery device 51 may supply a voltage of the first battery 51B to a second motor device 220 through the second output terminal Nout2, and the second battery device 52 may supply a voltage of the second battery 52B to a third motor device 230 through the third output terminal Nout3.

In a second mode, the processor 60 may control the first mode switch MS1 such that the first inductor L1 is connected with the second output terminal Nout2. At the same time, the processor 60 may disconnect the first inductor L1 from the output node Ns of the fuel cell 10. Thus, the first inductor L1, a first converter switch Q1, a second converter switch Q2, a first auxiliary converter switch QC, and a second auxiliary converter switch QD may form an H bridge converter and may supply a voltage of the first output terminal Nout1 to the second output terminal Nout2.

Furthermore, in the second mode, the processor 60 may control the second mode switch MS2 such that the second inductor L2 is connected with the third output terminal Nout3. At the same time, the processor 60 may disconnect the second inductor L2 from the output node Ns of the fuel cell 10. Thus, the second inductor L2, a third converter switch Q3, a fourth converter switch Q4, a third auxiliary converter switch QA, and a fourth auxiliary converter switch QB may form an H bridge converter and may supply a voltage of the first output terminal Nout1 to the third output terminal Nout3.

Furthermore, the converter shown in FIG. 13 is applicable to an example shown in FIG. 4.

Figure 14:
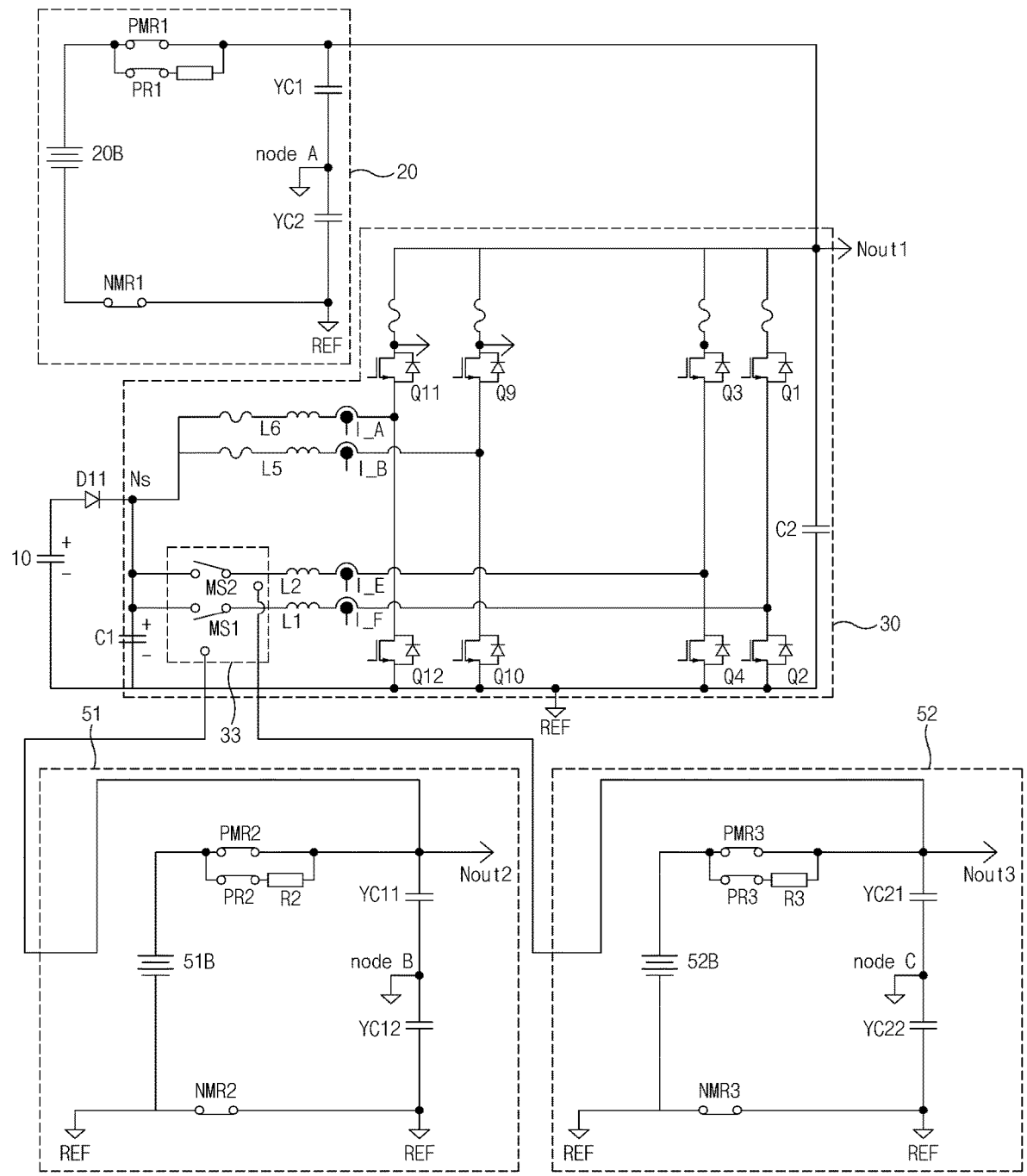
FIG. 14 shows an example circuit diagram for a power supply system.

FIG. 14 shows another example circuit diagram for a power supply system. FIG. 14 may be a circuit diagram of a power supply system shown in FIG. 3. A detailed description of substantially the same configuration as the above-mentioned example in the description of FIG. 14 will be omitted.

Referring to FIG. 14, a power supply system 100 for an aircraft may include an auxiliary battery device 20, a converter device 30, a first battery device 51, and a second battery device 52.

The auxiliary battery device 20 may include an auxiliary battery 20B and a circuit device for controlling a timing if a voltage of the auxiliary battery 20B is output to a first output terminal Nout1. The circuit device may include a first positive relay PMR1, a first negative relay NMR1, a first precharge relay PR1, a first Y capacitor YC1, and a second Y capacitor YC2.

The converter device 30 may include first and second half-bridge converters, fifth and sixth half-bridge converters, a first link capacitor C1, and a second link capacitor C2. The first half-bridge converter may include a first switching device (Q1 and Q2) and a first inductor L1. The second half-bridge converter may include a second switching device (Q3 and Q4) and a second inductor L2. The fifth half-bridge converter may include the first switching device (Q1 and Q2) and a fifth inductor L5. The sixth half-bridge converter may include the first switching device (Q1 and Q2) and a sixth inductor L6.

The first and second switching devices and the fifth and sixth switching devices may alternately switch a voltage through a rectifier diode D11 from a fuel cell 10.

A mode switch device 33 may include a first mode switch MS1 and a second mode switch MS2.

The first mode switch MS1 may be a single pole double throw (SPDT) relay which connects the first inductor L1 with a cathode of the rectifier diode D11 or a second output terminal Nout2. The second mode switch MS2 may be a single pole double throw (SPDT) relay which connects the second inductor L2 with a cathode of the rectifier diode D11 or a third output terminal Nout3.

The first battery device 51 may include a first battery 51B and a circuit device for controlling a timing if a voltage of the first battery 51B is output to the second output terminal Nout2.

The second battery device 52 may include a second battery 52B and a circuit device for controlling a timing if a voltage of the second battery 52B is output to the third output terminal Nout3.

The control method of the power supply system shown in FIG. 14 may include the same procedure as a control method of a power supply system shown in FIG. 12.

Figure 15:
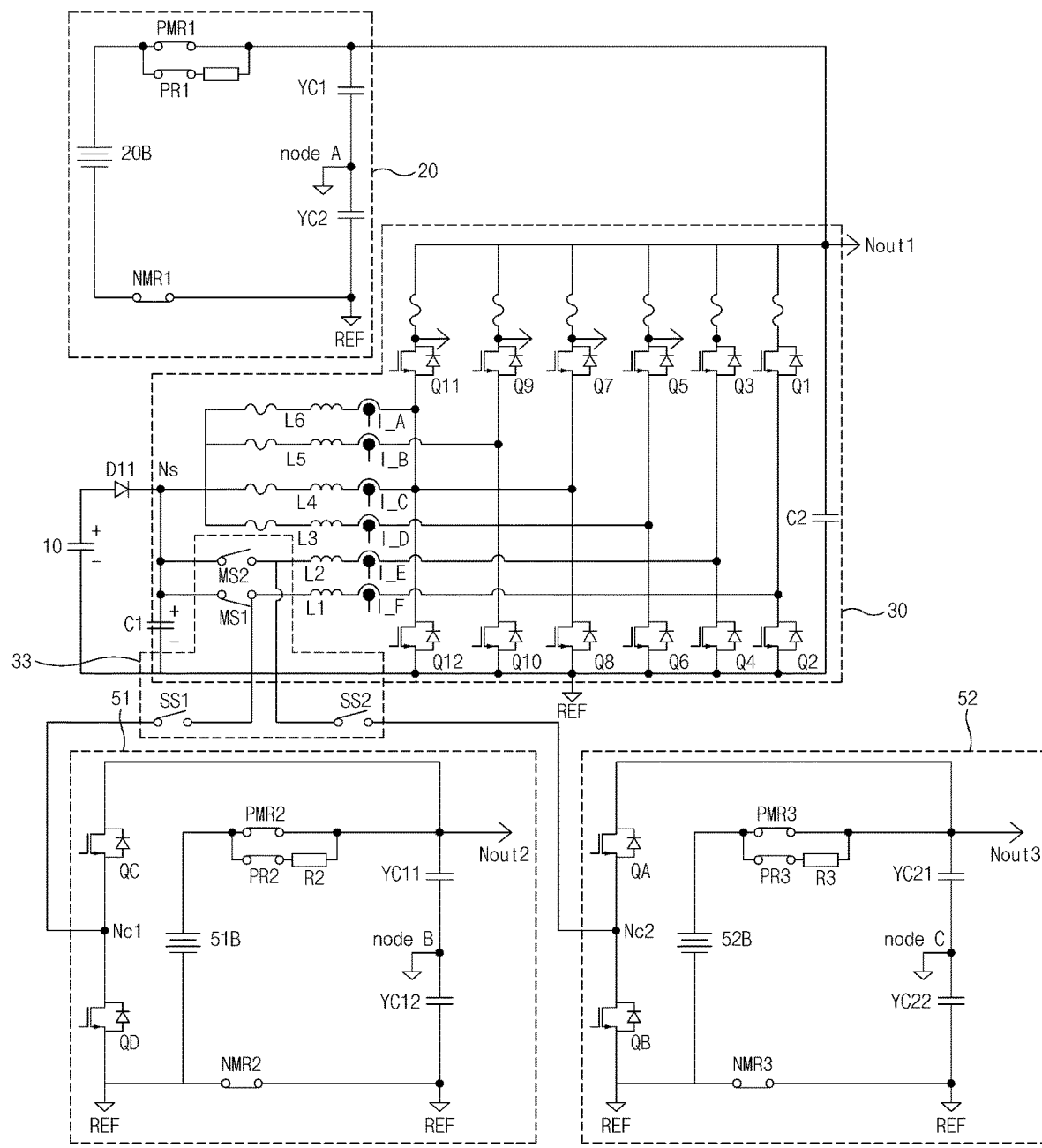
FIG. 15 shows an example circuit diagram for a power supply system.
Figure 16:
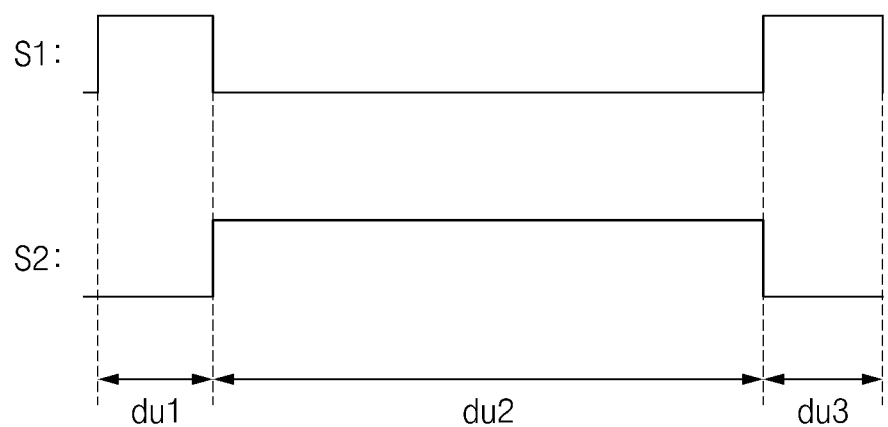
FIG. 16 shows an example of an operation timing of a control signal for controlling a mode switch device.

FIG. 15 shows another example circuit diagram for a power supply system. FIG. 16 shows an example of an operation timing of a control signal for controlling a mode switch device. FIG. may be a circuit diagram of a power supply system shown in FIG. 3. A detailed description of substantially the same configuration as the above-mentioned examples in the description of FIG. 15 will be omitted.

Referring to FIGS. 15 and 16, a power supply system 100 for an aircraft may include an auxiliary battery device 20, a converter device 30, a first battery device 51, and a second battery device 52.

The converter device 30 may include first to sixth half-bridge converters. For example, the first half-bridge converter may include a first switching device (Q1 and Q2) and a first inductor L1.

A mode switch device 33 may include a first mode switch MS1, a second mode switch MS2, a first auxiliary mode switch SS1, and a second auxiliary mode switch SS2.

The first mode switch MS1 may be switched by a first control signal S1 and may switch a connection between a first inductor L1 and a cathode of a rectifier diode D11.

The first auxiliary mode switch SS1 may be switched by a second control signal S2 and may switch a connection between the first inductor L1 and a second output terminal Nout2.

The first mode switch MS1 and the first auxiliary mode switch SS1 may operate complementary to each other. In other words, in a duration where the first mode switch MS1 is closed, the first auxiliary mode switch SS1 be opened. Furthermore, in a duration where the first mode switch MS1 is opened, the first auxiliary mode switch SS1 may be closed.

The second mode switch MS2 may be switched by the first control signal S1 and may switch a connection between a second inductor L2 and the cathode of the rectifier diode D11.

The second auxiliary mode switch SS2 may be switched by the second control signal S2 and may switch a connection between the second inductor L2 and the second output terminal Nout2.

The second mode switch MS2 and the second auxiliary mode switch SS2 may operate complementary to each other. In other words, in a duration where the second mode switch MS2 is closed, the second auxiliary mode switch SS2 be opened. Furthermore, in a duration where the second mode switch MS2 is opened, the second auxiliary mode switch SS2 may be closed.

In a take-off duration du1 and a landing duration du1, the first mode switch MS1 may be closed by the first control signal S1, and the first auxiliary mode switch SS1 may be opened by the second control signal S2. Furthermore, the second mode switch MS2 may be closed by the first control signal S1, and the second auxiliary mode switch SS2 may be opened by the second control signal S2.

Thus, in the take-off duration du1 and the landing duration du1, the converter device 30 may boost and supply a voltage generated by a fuel cell 10 to the first output terminal Nout1.

In a cruising duration du2, the first mode switch MS1 may be opened by the first control signal S1, and the first auxiliary mode switch SS1 may be closed by the second control signal S2. Furthermore, the second mode switch MS2 may be opened by the first control signal S1, and the second auxiliary mode switch SS2 may be closed by the second control signal S2.

Thus, in the cruising duration du2, a first converter switch Q1, a second converter switch Q2, the first inductor L1, a first auxiliary converter switch QC, and a second auxiliary converter switch QD may form a first H bridge converter. The voltage of the first output terminal Nout1 may be supplied to a first battery 51B using the first H bridge converter.

Likewise, a third converter switch Q3, a fourth converter switch Q4, the second inductor L2, a third auxiliary converter switch QA, and a fourth auxiliary converter switch QB may form a second H bridge converter. The voltage of the first output terminal Nout1 may be supplied to a second battery 52B using the second H bridge converter.

The power supply system and the control method thereof may use a fuel cell and a battery together to drive a plurality of propellers, thus making the take-off of the aircraft easier while reducing a weight compared to using the fuel cell.

Furthermore, the power supply system and the control method thereof may charge the battery using a fuel cell in a duration the power of the aircraft is not large, thus further increasing a cruising distance while reducing the capacity of the battery.

In addition, various effects ascertained directly or indirectly through the present disclosure may be provided.

The present disclosure provides a power supply system and a control method thereof for making the take-off of an aircraft easier while reducing a weight.

The present disclosure provides a power supply system and a control method thereof for further increasing a cruising distance without increasing a weight.

The technical problems to be solved by the present disclosure are not limited to the aforementioned problems, and any other technical problems not mentioned herein will be clearly understood from the following description by those skilled in the art to which the present disclosure pertains.

According to the present disclosure, a power supply system for an aircraft may include a fuel cell that generates electrical energy, a converter device configured to supply, through a first output terminal, a voltage generated by the fuel cell to a first motor device for driving the aircraft and configured to switch a connection between the fuel cell and the converter device depending on a predetermined driving mode, a battery configure to supply, through a second output terminal, a voltage to a second motor device for driving the aircraft, the second output terminal being connected with an output node of the fuel cell, and a processor configured to control the connection between the fuel cell and the converter device depending on the predetermined driving mode.

The converter device may include a first converter switch and a second converter switch connected in series with each other between the first output terminal and a ground and a first inductor connected with a node between the first converter switch and the second converter switch.

The converter device may further include a mode switch device configured to be controlled by the processor to selectively connect with the output node of the fuel cell.

The processor is configured to control the mode switch device, such that the predetermined driving mode is a first mode, to connect the first inductor with the output node of the fuel cell, if an altitude of the aircraft is less than a predetermined first threshold altitude after the aircraft is turned on.

The processor is configured to control the mode switch device, such that the predetermined driving mode is a second mode, to disconnect the first inductor from the output node of the fuel cell, if the aircraft ascends above the first threshold altitude.

The processor is configured to control the mode switch device, such that the predetermined driving mode is the first mode, if the aircraft descends below a predetermined second threshold altitude.

The mode switch device is configured to be controlled by the processor to connect the first inductor with the second output terminal in the second mode.

The mode switch device may be a single pole double throw (SPDT) relay configured to be controlled by the processor to connect the first inductor with the output node of the fuel cell or the second output terminal.

The mode switch device may include a mode switch configured to connect the first inductor with the output node of the fuel cell in the first mode and an auxiliary mode switch configured to connect the first inductor with the second output terminal in the second mode.

The mode switch and the auxiliary mode switch may be complementary to each other in operation timing.

The power supply system may further include a first auxiliary converter switch and a second auxiliary converter switch, connected in series with each other, between the second output terminal and the ground. The mode switch device may connect a node between the first auxiliary converter switch and the second auxiliary converter switch with the first inductor.

The processor is configured to set a turn-on duty ratio of the first converter switch and the first auxiliary converter switch to determine a magnitude of a voltage distributed to the second output terminal.

The converter device may further include a first link capacitor connected in parallel with the fuel cell and a second link capacitor connected between the first output terminal and the ground.

The converter device may further include a third converter switch and a fourth converter switch connected in series with each other between the first output terminal and a ground and a second inductor connected with a node between the third converter switch and the fourth converter switch.

The second inductor is configured to maintain a state where the second output terminal is connected with the output node of the fuel cell.

According to the present disclosure, a control method of a power supply system may include supplying, by a converter device included in the power supply system, a voltage of a fuel cell to a first motor device through a first output terminal of the power supply system in a first mode of the power supply system, supplying, by a battery device included in the power supply system, the voltage to a second motor device through a second output terminal of the power supply system, and connecting, by the converter device, the first output terminal with the second output terminal to charge the battery device using the voltage output by the fuel cell, such that the power supply system operates in a second mode, if the aircraft ascends above a predetermined first threshold altitude.

The control method may further include disconnecting the second output terminal from the first output terminal and operating in the first mode, if the aircraft descends below a predetermined second threshold altitude.

The connecting of the first output terminal and the second output terminal may include providing an output of a half-bridge converter to the second output terminal, wherein the half-bridge converter may comprise a first converter switch, and a second converter switch, and an inductor, wherein the first converter switch, the second converter switch, and the inductor are formed between the first output terminal and a ground.

The connecting of the first output terminal and the second output terminal may include disconnecting a connection between the inductor and an output node of the fuel cell and connecting the inductor with the second output terminal.

The connecting of the first output terminal and the second output terminal may include providing an output of an H bridge converter, wherein the H bridge converter comprises the half-bridge converter, a first auxiliary converter switch connected with the half-bridge converter and the second output terminal, and a second auxiliary converter switch connected with the half-bridge converter and the second output terminal.

Hereinabove, although the present disclosure has been described with examples and the accompanying drawings, the present disclosure is not limited thereto, but may be variously modified and altered by those skilled in the art to which the present disclosure pertains without departing from the spirit and scope of the present disclosure claimed in the following claims.

Therefore, the examples of the present disclosure are provided to explain the spirit and scope of the present disclosure, but not to limit them, so that the spirit and scope of the present disclosure is not limited by the examples. The scope of the present disclosure should be construed on the basis of the accompanying claims, and all the technical ideas within the scope equivalent to the claims should be included in the scope of the present disclosure.

What is claimed is:

1. A power supply system for an aircraft, the power supply system comprising:
a fuel cell configured to generate a voltage;
a converter device configured to:
supply, through a first output terminal of the power supply system, the voltage generated by the fuel cell to a first motor device for driving the aircraft; and
switch, based on a predetermined driving mode, a connection between the fuel cell and the converter device;
a battery configured to supply, through a second output terminal of the power supply system, a voltage to a second motor device for driving the aircraft, the second output terminal being connected with an output node of the fuel cell; and
a processor configured to control the connection between the fuel cell and the converter device depending on the predetermined driving mode,
wherein the converter device comprises:
a first converter switch and a second converter switch, connected in series with each other, between the first output terminal and a reference node;
a first inductor connected with a node between the first converter switch and the second converter switch; and
a mode switch device configured to electrically connect the first inductor with the output node of the fuel cell or with the second output terminal.

2. The power supply system of claim 1, wherein the mode switch device is configured to be controlled by the processor to selectively connect the first inductor with the output node of the fuel cell or disconnect the first inductor from the output node of the fuel cell.

3. The power supply system of claim 1, wherein the processor is configured to control the mode switch device, such that the predetermined driving mode is a first mode, to connect the first inductor with the output node of the fuel cell, based on a determination that an altitude of the aircraft is less than a predetermined first threshold altitude after the aircraft is turned on.

4. The power supply system of claim 3, wherein the processor is configured to control the mode switch device, such that the predetermined driving mode is a second mode, to disconnect the first inductor from the output node of the fuel cell, based on a determination that the aircraft ascends above the first threshold altitude.

5. The power supply system of claim 4, wherein the processor is configured to control the mode switch device, such that the predetermined driving mode is the first mode, based on a determination that the aircraft descends below a predetermined second threshold altitude.

6. The power supply system of claim 4, wherein the mode switch device is configured to be controlled by the processor to connect the first inductor with the second output terminal in the second mode.

7. The power supply system of claim 6, wherein the mode switch device is a single pole double throw (SPDT) relay configured to be controlled by the processor to connect the first inductor with the output node of the fuel cell or the second output terminal.

8. The power supply system of claim 6, wherein the mode switch device comprises:
    a mode switch configured to connect the first inductor with the output node of the fuel cell in the first mode; and
    an auxiliary mode switch configured to connect the first inductor with the second output terminal in the second mode.

9. The power supply system of claim 8, wherein the mode switch and the auxiliary mode switch are complementary to each other in operation timing.

10. The power supply system of claim 6, further comprising:
    a first auxiliary converter switch and a second auxiliary converter switch, connected in series with each other, between the second output terminal and the reference node,
    wherein the mode switch device is configured to connect a node between the first auxiliary converter switch and the second auxiliary converter switch with the first inductor.

11. The power supply system of claim 10, wherein the processor is configured to set a turn-on duty ratio of the first converter switch and the first auxiliary converter switch to determine a magnitude of a voltage distributed to the second output terminal.

12. The power supply system of claim 6, wherein the converter device further comprises:
    a first link capacitor connected in parallel with the fuel cell; and
    a second link capacitor connected between the first output terminal and the reference node.

13. The power supply system of claim 1, wherein the converter device further comprises:
    a third converter switch and a fourth converter switch connected in series with each other between the first output terminal and a reference node; and
    a second inductor connected with a node between the third converter switch and the fourth converter switch.

14. The power supply system of claim 13, wherein the second inductor is configured to maintain a state where the second output terminal is connected with the output node of the fuel cell.

15. A control method for a power supply system of an aircraft, the control method comprising:
    supplying, by a converter device of the power supply system, a first voltage of a fuel cell to a first motor device through a first output terminal of the power supply system in a first mode of the power supply system;
    supplying, by a battery device of the power supply system, a second voltage to a second motor device through a second output terminal of the power supply system; and
    connecting, by the converter device, the first output terminal with the second output terminal to charge the battery device using the first voltage output by the fuel cell, such that the power supply system operates in a second mode, based on a determination that the aircraft ascends above a predetermined first threshold altitude,
    wherein the connecting of the first output terminal and the second output terminal comprises:
    providing an output of a half-bridge converter to the second output terminal, wherein the half-bridge converter comprises:
        a first converter switch;
        a second converter switch; and
        an inductor, wherein the first converter switch, the second converter switch, and the inductor are formed between the first output terminal and a reference node.

16. The control method of claim 15, further comprising:
    disconnecting the second output terminal from the first output terminal and operating in the first mode, based on a determination that the aircraft descends below a predetermined second threshold altitude.

17. The control method of claim 15, wherein the connecting of the first output terminal and the second output terminal comprises:
    disconnecting a connection between the inductor and an output node of the fuel cell; and
    connecting the inductor with the second output terminal.

18. The control method of claim 15, wherein the connecting of the first output terminal and the second output terminal comprises:
    providing an output of an H bridge converter, wherein the H bridge converter comprises:
        the half-bridge converter;
        a first auxiliary converter switch connected with the half-bridge converter and the second output terminal; and
        a second auxiliary converter switch connected with the half-bridge converter and the second output terminal.

19. A power supply system for an aircraft, the power supply system comprising:
    a fuel cell configured to generate a voltage;
    a converter device configured to:
        supply, through a first output terminal of the power supply system, the voltage generated by the fuel cell to a first motor device for driving the aircraft; and
        switch, based on a predetermined driving mode, a connection between the fuel cell and the converter device;
    a battery configured to supply, through a second output terminal of the power supply system, a voltage to a second motor device for driving the aircraft, the second output terminal being connected with an output node of the fuel cell; and a processor configured to control the connection between the fuel cell and the converter device depending on the predetermined driving mode,
wherein the converter device comprises:
   a first inductor; and
   a mode switch device configured to be controlled by the processor to selectively connect the first inductor with the output node of the fuel cell,
wherein the processor is configured to control the mode switch device, such that the predetermined driving mode is a second mode, to disconnect the first inductor from the output node of the fuel cell, and
wherein the mode switch device is configured to be controlled by the processor to electrically connect the first inductor with the second output terminal in the second mode.

* * * * *